United States Patent
Taguchi et al.

(10) Patent No.: US 9,761,263 B2
(45) Date of Patent: Sep. 12, 2017

(54) OPTICAL INFORMATION RECORDING AND REPRODUCING DEVICE, OPTICAL INFORMATION RECORDING AND REPRODUCING METHOD

(71) Applicant: Hitachi Consumer Electronics Co., Ltd., Yokohama, Kanagawa (JP)

(72) Inventors: Hirofumi Taguchi, Tokyo (JP); Koji Fujita, Tokyo (JP); Nobuo Nakai, Tokyo (JP); Koichiro Nishimura, Tokyo (JP); Taku Hoshizawa, Tokyo (JP); Kazuyoshi Yamazaki, Tokyo (JP)

(73) Assignee: Hitachi Consumer Electronics Co., Ltd., Kanagawa (JP)

( * ) Notice: Subject to any disclaimer, the term of this patent is extended or adjusted under 35 U.S.C. 154(b) by 113 days.

(21) Appl. No.: 14/651,016

(22) PCT Filed: Dec. 12, 2012

(86) PCT No.: PCT/JP2012/082127
§ 371 (c)(1),
(2) Date: Jun. 10, 2015

(87) PCT Pub. No.: WO2014/091571
PCT Pub. Date: Jun. 19, 2014

(65) Prior Publication Data
US 2015/0318009 A1 Nov. 5, 2015

(51) Int. Cl.
*G11B 7/24* (2013.01)
*G11B 7/0065* (2006.01)
*G11B 7/127* (2012.01)
*G11B 7/1395* (2012.01)
*G11B 7/1381* (2012.01)

(52) U.S. Cl.
CPC ............ *G11B 7/0065* (2013.01); *G11B 7/127* (2013.01); *G11B 7/1381* (2013.01); *G11B 7/1395* (2013.01)

(58) Field of Classification Search
CPC ..... G11B 7/0065; G11B 7/127; G11B 7/1381; G11B 7/1395
See application file for complete search history.

(56) References Cited

U.S. PATENT DOCUMENTS

2008/0117788 A1* 5/2008 Kasazumi ............ G03H 1/2286
369/103
2010/0195005 A1 8/2010 Negishi et al.

FOREIGN PATENT DOCUMENTS

JP 62-188947 A 8/1987
JP 64-000937 A 1/1989
(Continued)

OTHER PUBLICATIONS

International Search Report of PCT/JP2012/082127.

*Primary Examiner* — Elizabeth Mulvaney
(74) *Attorney, Agent, or Firm* — Mattingly & Malur, PC

(57) ABSTRACT

An optical information recording and reproducing device that records information on a recording medium and/or reproduces information on the recording medium, using holography is configured to include a laser light source that performs irradiation with laser light, a first light-shielding portion which is capable of switching between transmission and shielding of laser light emitted from the laser light source, and a driving circuit that drives the switching between transmission and shielding of the first light-shielding portion, and a first movement portion that moves the first light-shielding portion.

16 Claims, 28 Drawing Sheets

(56) References Cited

FOREIGN PATENT DOCUMENTS

| | | |
|---|---|---|
| JP | 7-020042 A | 1/1995 |
| JP | 2004-055096 A | 2/2004 |
| JP | 2004-272949 A | 9/2004 |
| JP | 2006-172582 A | 6/2006 |
| JP | 2007-004041 A | 1/2007 |
| JP | 2010-175907 A | 8/2010 |

* cited by examiner

[Fig. 2]

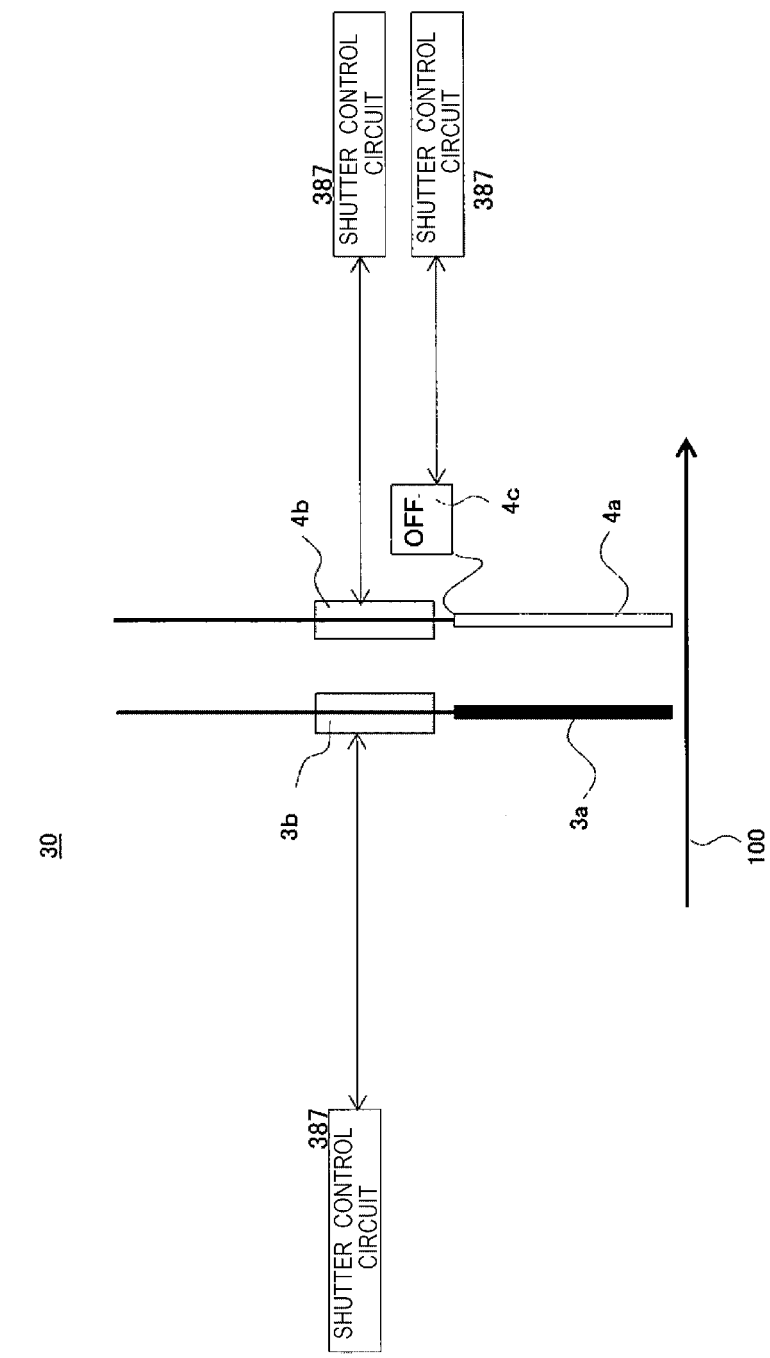
[Fig. 4]

[Fig. 5(a)]
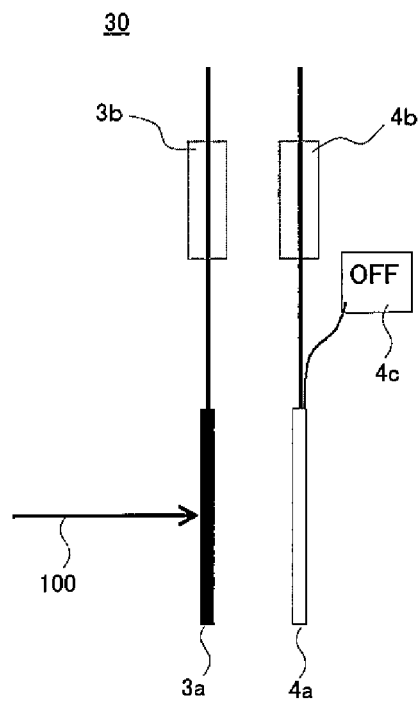
[Fig. 5(b)]
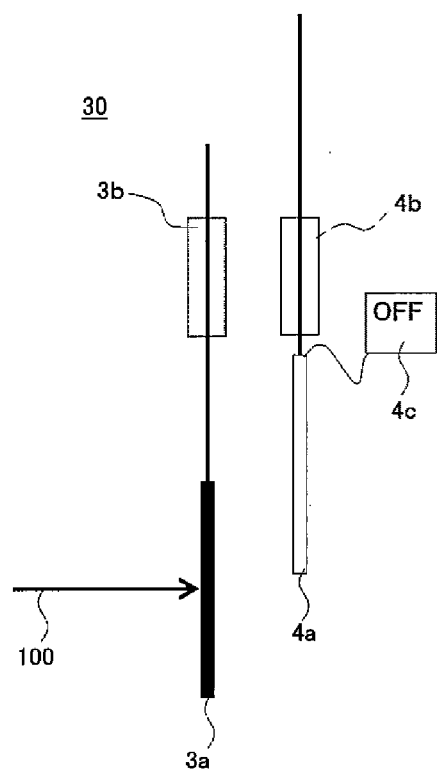

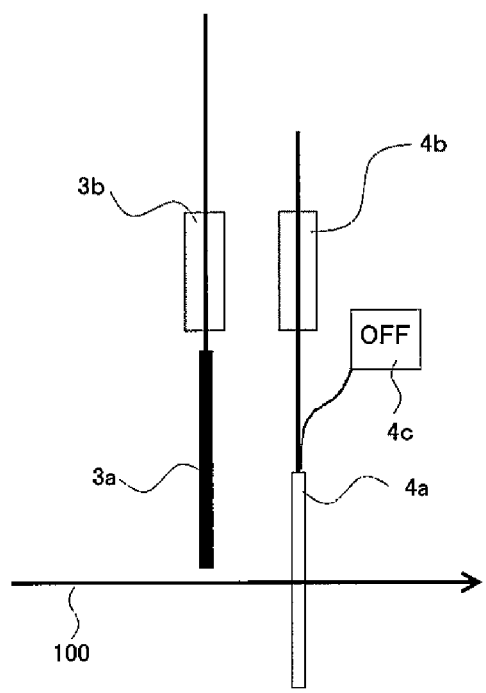
[Fig. 6]

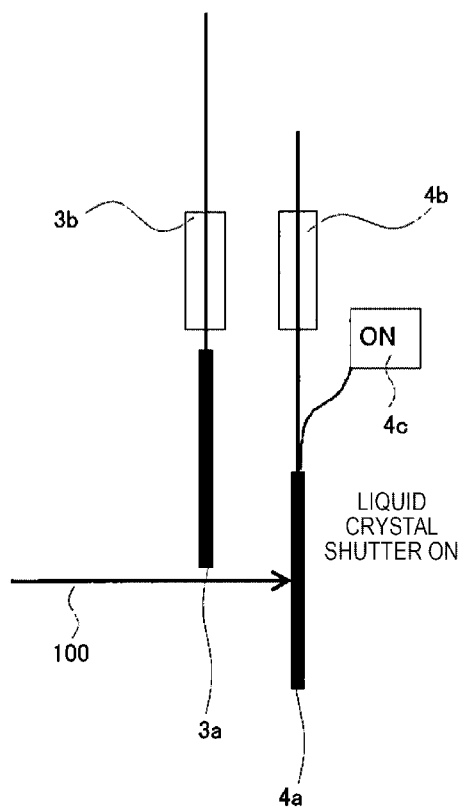
[Fig. 7]

[Fig. 8]

| MODE | | MECHANICAL SHUTTER | LIQUID CRYSTAL SHUTTER | | SHUTTER (LIGHT-SHIELDING) FUNCTION |
|---|---|---|---|---|---|
| | | INSERTION OR RETREAT INTO OR FROM OPTICAL PATH | INSERTION OR RETREAT INTO OR FROM OPTICAL PATH | ON or OFF | |
| (1) | DURING POWER-ON | INSERTION | INSERTION | ON | ON |
| (2) | DURING STANDBY | INSERTION | INSERTION | OFF | ON |
| (3) | DURING LOADING | INSERTION | RETREAT | ON | ON |
| (4) | DURING CURING | INSERTION | RETREAT | OFF | ON |

[Fig. 9]

| MODE | | MECHANICAL SHUTTER | LIQUID CRYSTAL SHUTTER | | SHUTTER (LIGHT-SHIELDING) FUNCTION |
|---|---|---|---|---|---|
| | | INSERTION OR RETREAT INTO OR FROM OPTICAL PATH | INSERTION OR RETREAT INTO OR FROM OPTICAL PATH | ON or OFF | |
| (5) DURING RECORDING | 5-1 DURING NORMAL RECORDING | RETREAT | INSERTION | OFF | OFF |
| | 5-2 DURING PAGE MOVEMENT DURING BOOK MOVEMENT | RETREAT | INSERTION | ON | ON |

[Fig. 10]

| MODE | | MECHANICAL SHUTTER | LIQUID CRYSTAL SHUTTER | | SHUTTER (LIGHT-SHIELDING) FUNCTION |
|---|---|---|---|---|---|
| | | INSERTION OR RETREAT INTO OR FROM OPTICAL PATH | INSERTION OR RETREAT INTO OR FROM OPTICAL PATH | ON or OFF | |
| (6) DURING REPRODUCTION | 6-1 | RETREAT | RETREAT | OFF | OFF |
| | 6-2 | RETREAT | RETREAT | ON | OFF |

[Fig. 11(a)]
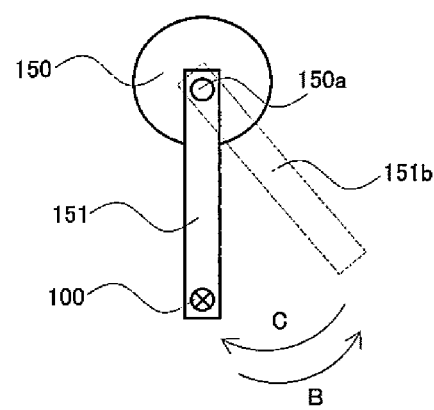
[Fig. 11(b)]
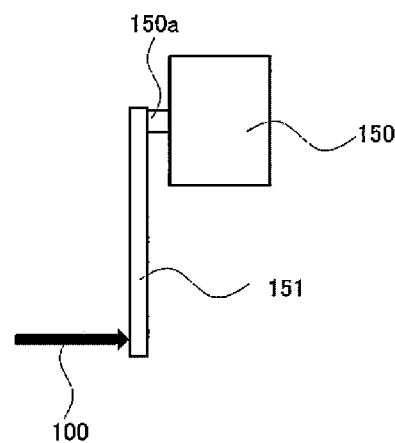

[Fig. 12(a)]
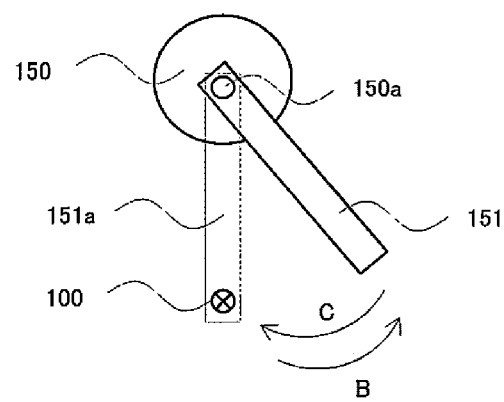
[Fig. 12(b)]
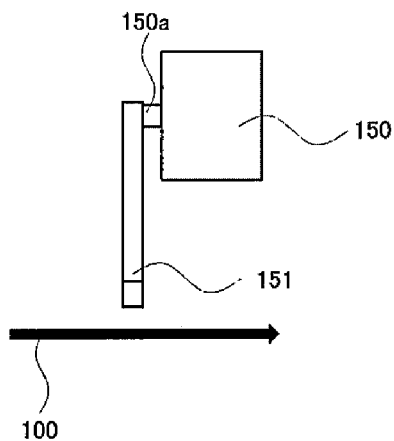

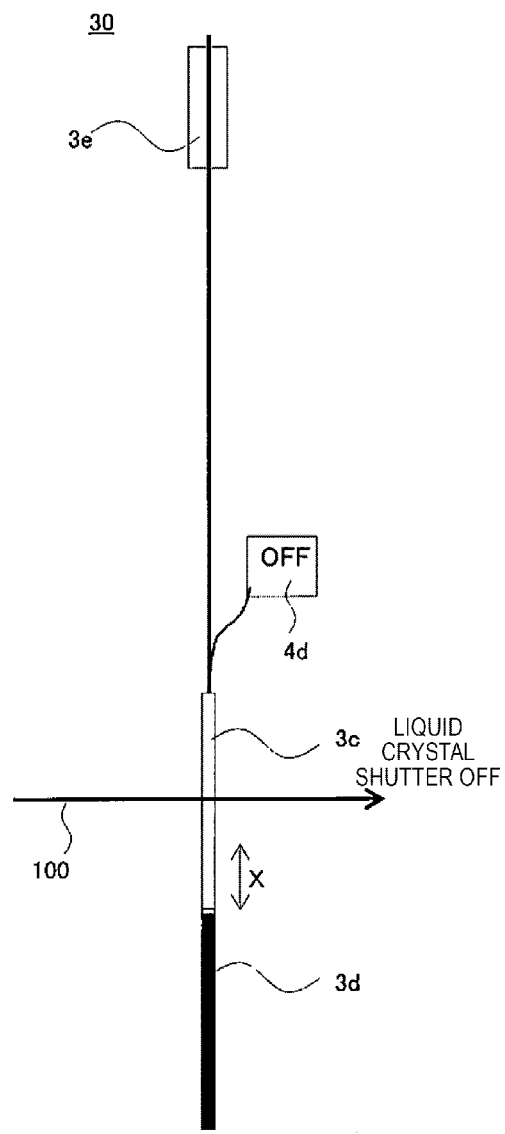
[Fig. 13(a)]

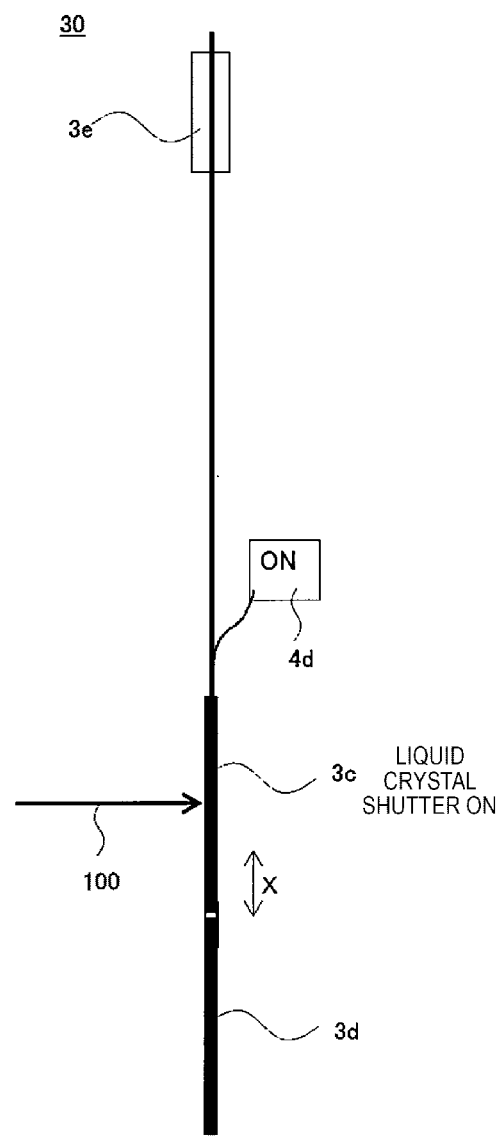

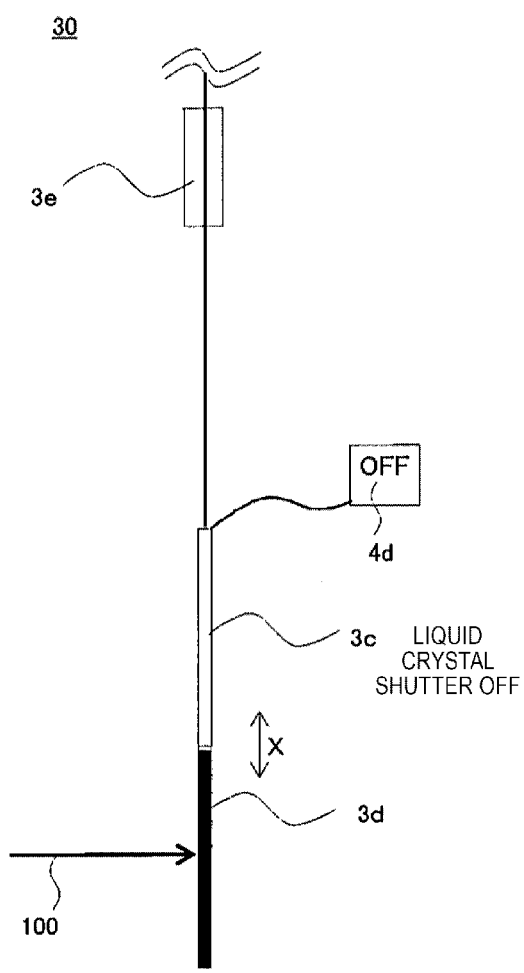

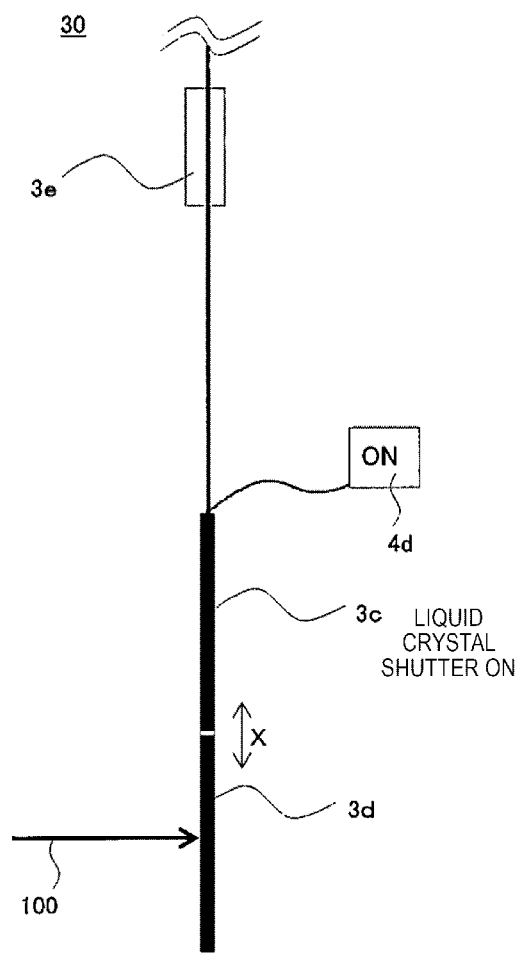

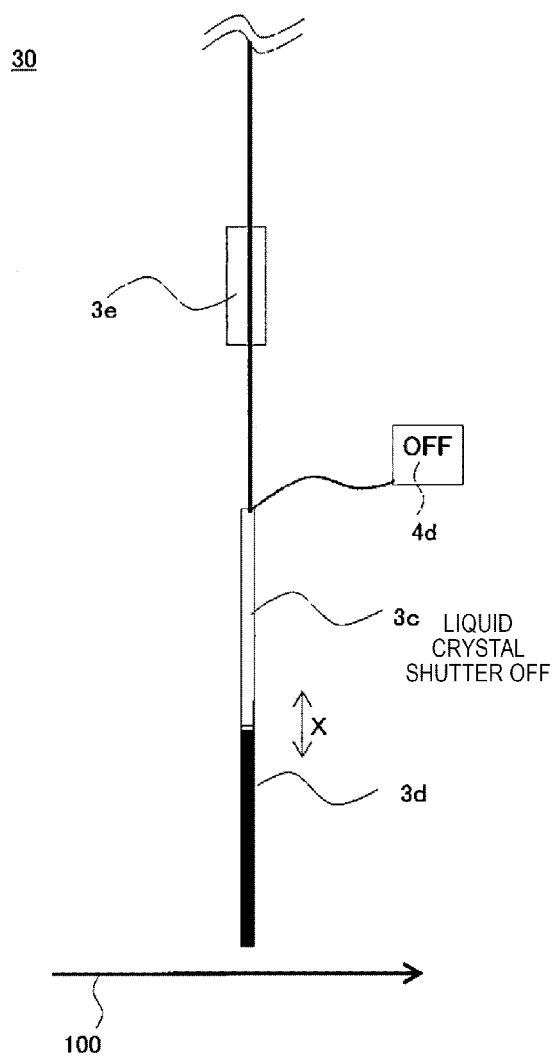
[Fig. 15(a)]

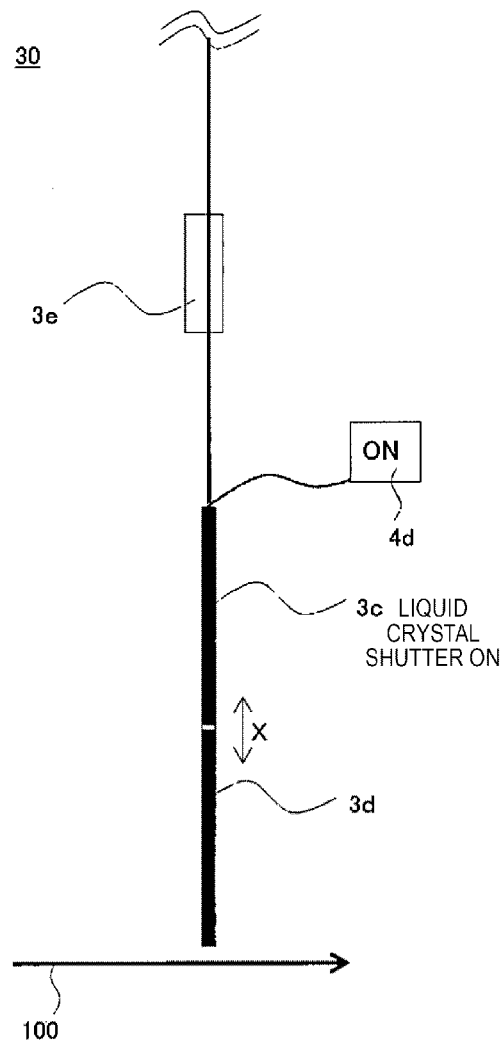
[Fig. 15(b)]

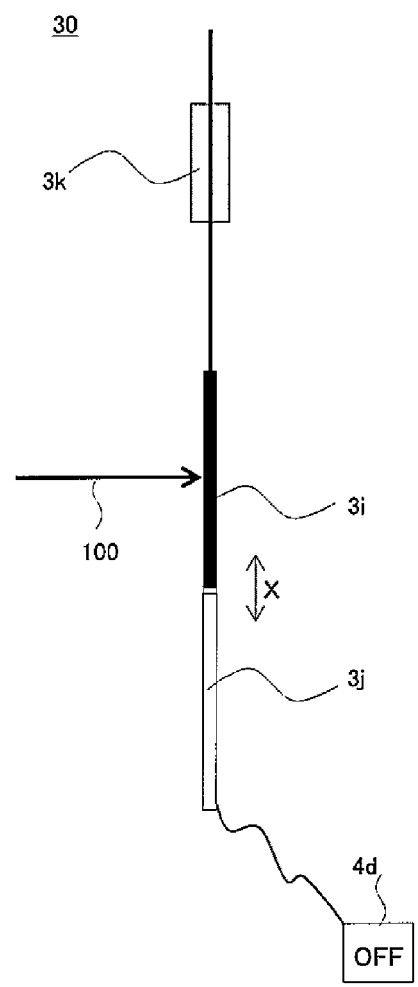
[Fig. 16(a)]

[Fig. 16(b)]
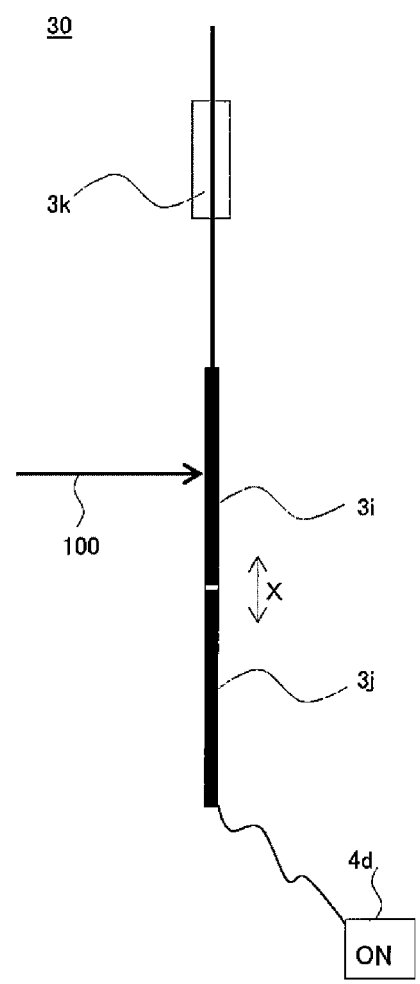

[Fig. 17(a)]
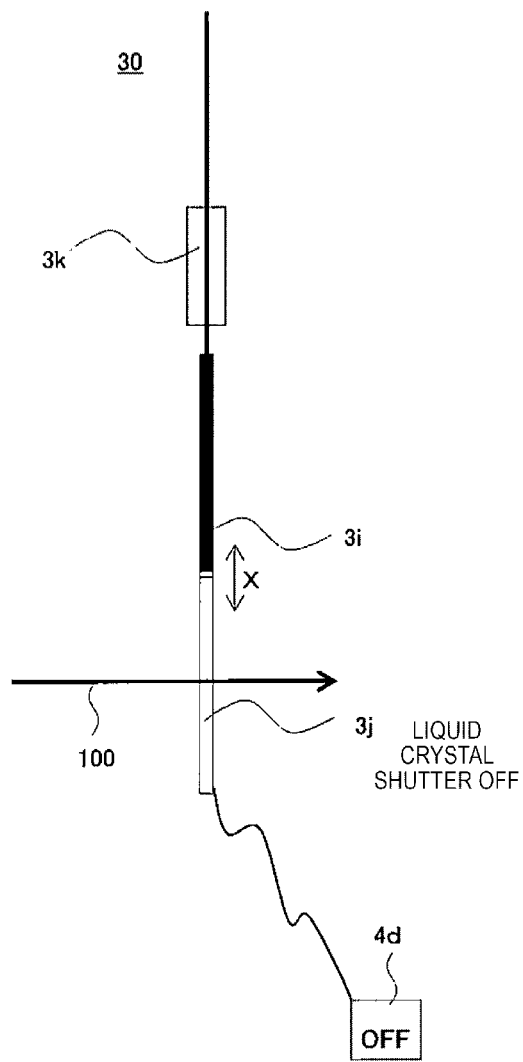

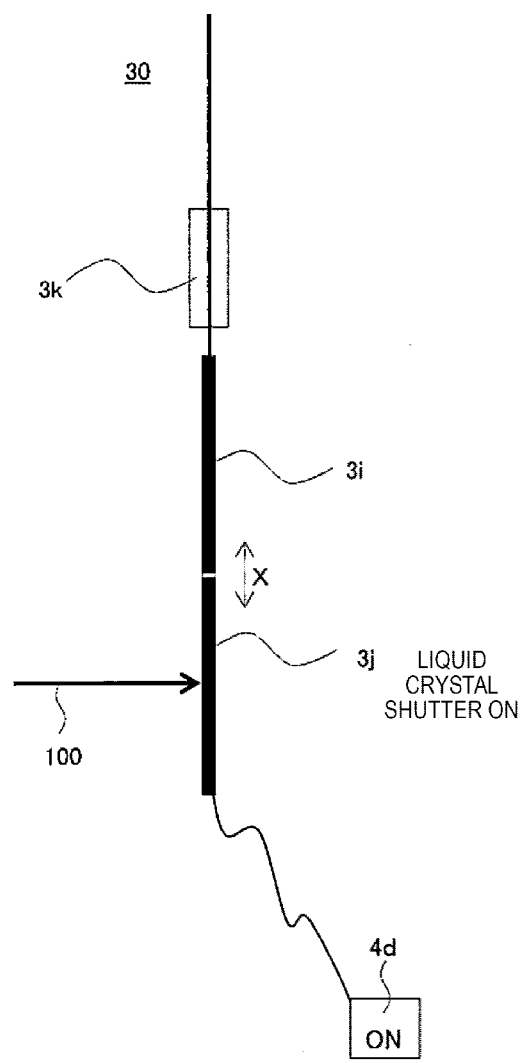
[Fig. 17(b)]

[Fig. 18]
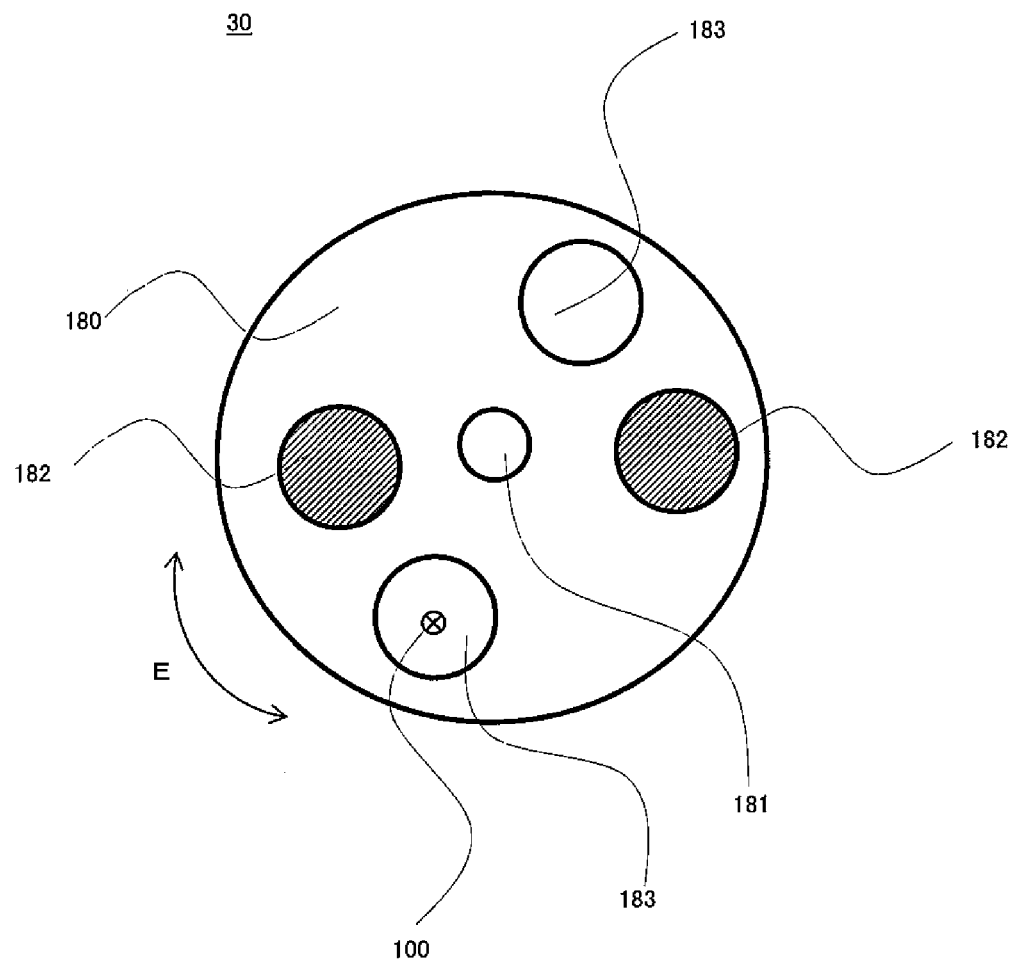

[Fig. 19(a)]
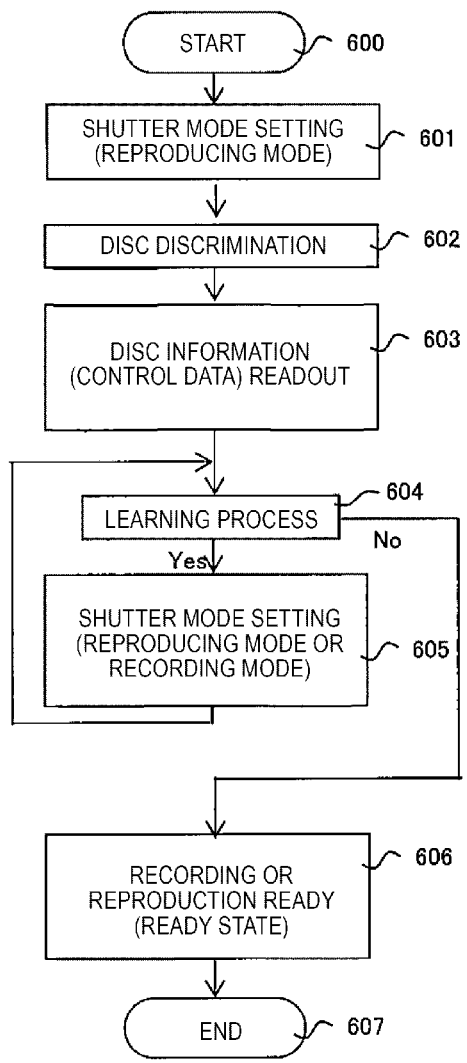

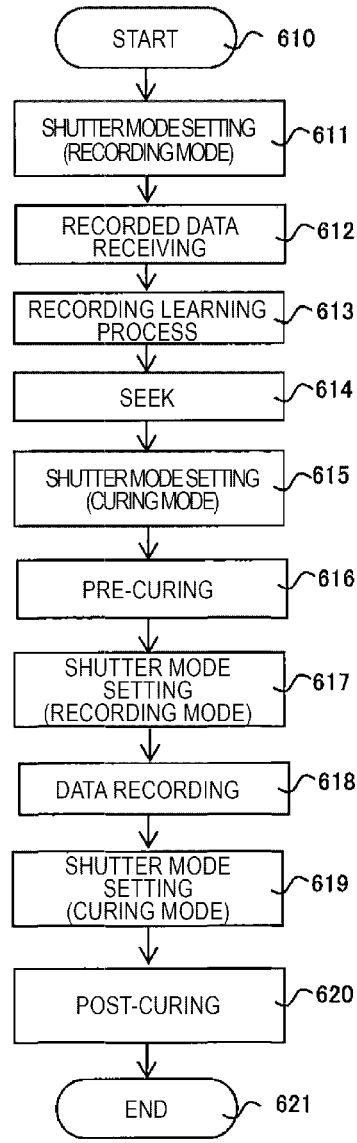
[Fig. 19(b)]

[Fig. 19(c)]
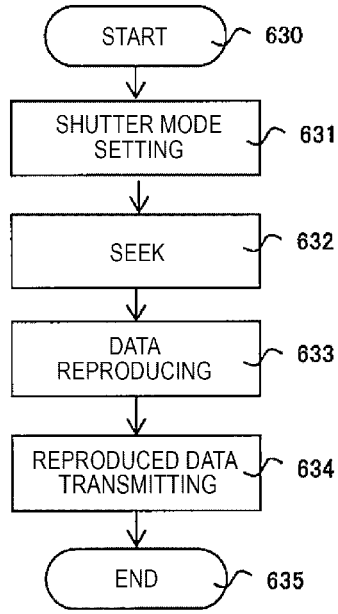
[Fig. 19(d)]
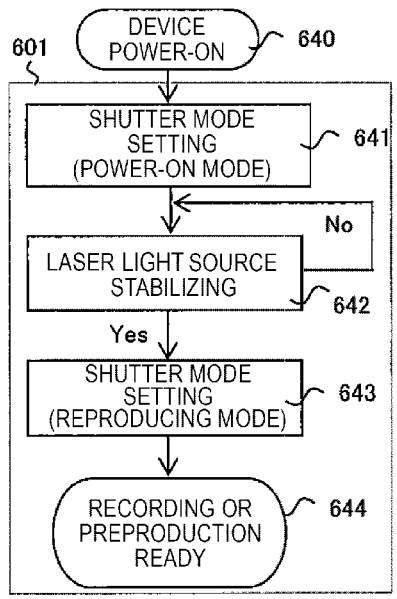

[Fig. 20]
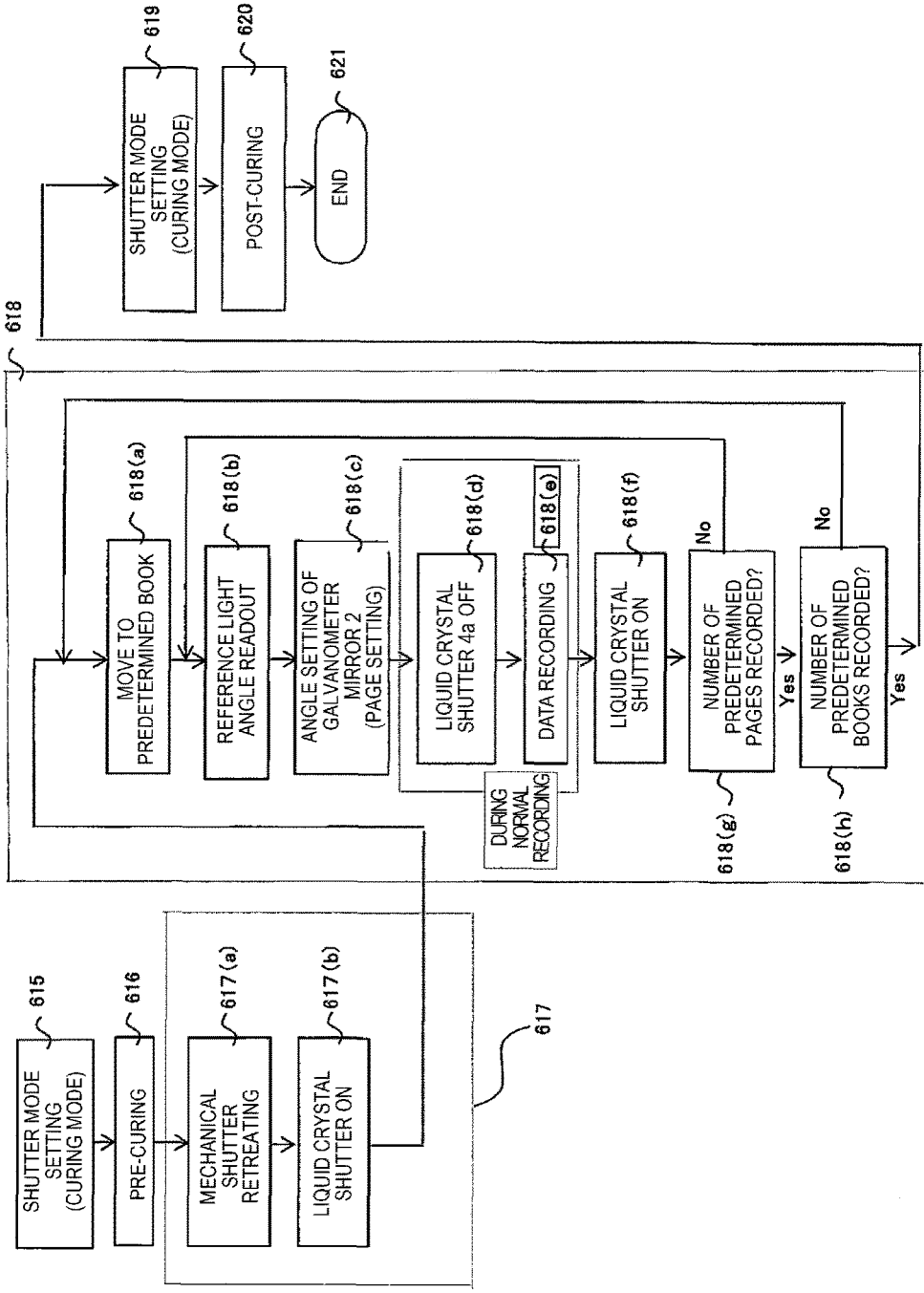

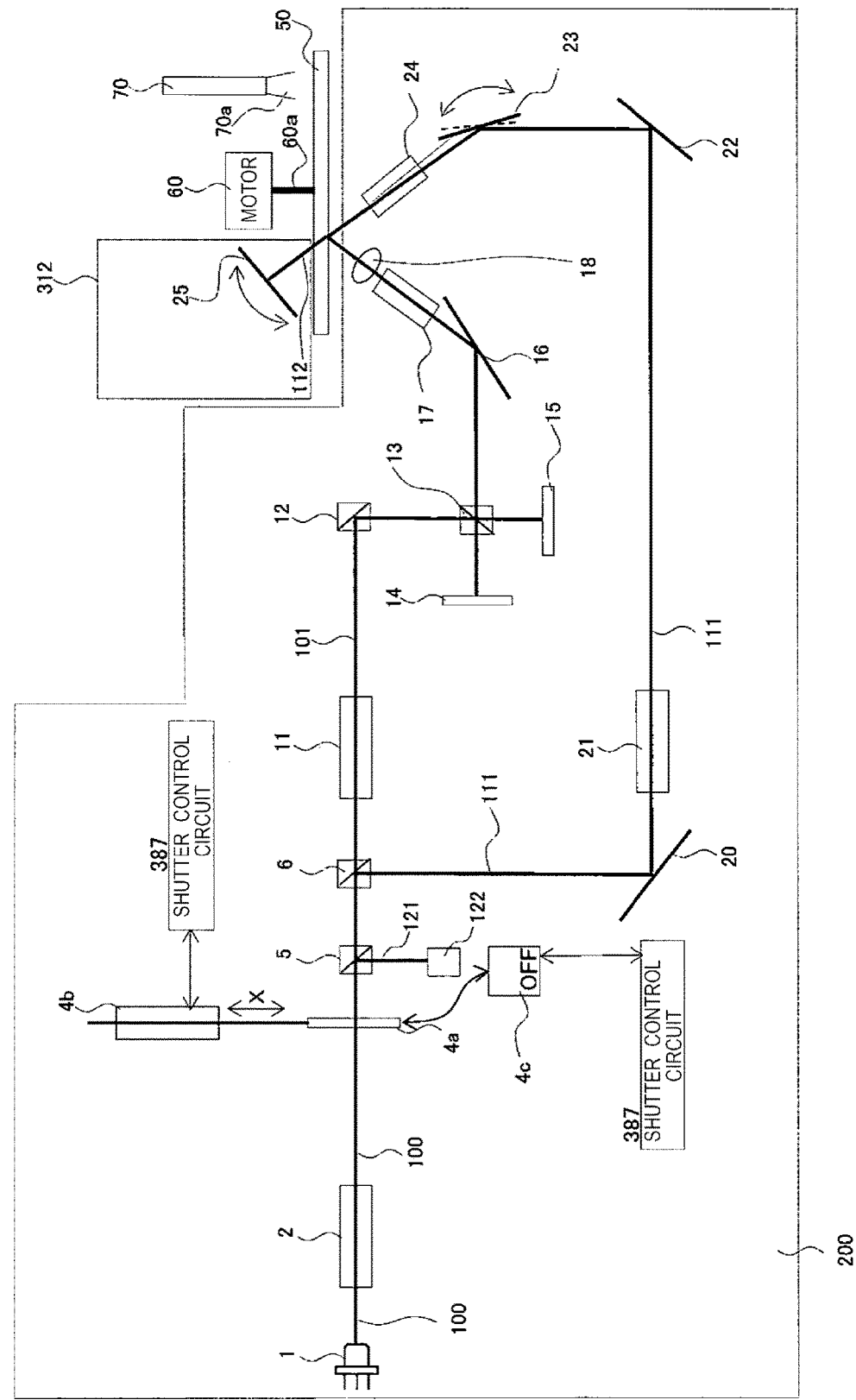
[Fig. 21]

[Fig. 22]

| | MODE | | LIQUID CRYSTAL SHUTTER | | SHUTTER (LIGHT-SHIELDING) FUNCTION |
|---|---|---|---|---|---|
| | | | INSERTION OR RETREAT INTO OR FROM OPTICAL PATH | ON or OFF | |
| (5) | DURING RECORDING | 5-1 DURING NORMAL RECORDING | INSERTION | OFF | OFF |
| | | 5-2 DURING PAGE MOVEMENT DURING BOOK MOVEMENT | INSERTION | ON | ON |

[Fig. 23]

| | MODE | | LIQUID CRYSTAL SHUTTER | | SHUTTER (LIGHT-SHIELDING) FUNCTION |
|---|---|---|---|---|---|
| | | | INSERTION OR RETREAT INTO OR FROM OPTICAL PATH | ON or OFF | |
| (6) | DURING REPRODUCTION | 6-1 | RETREAT | OFF | OFF |
| | | 6-2 | RETREAT | ON | OFF |

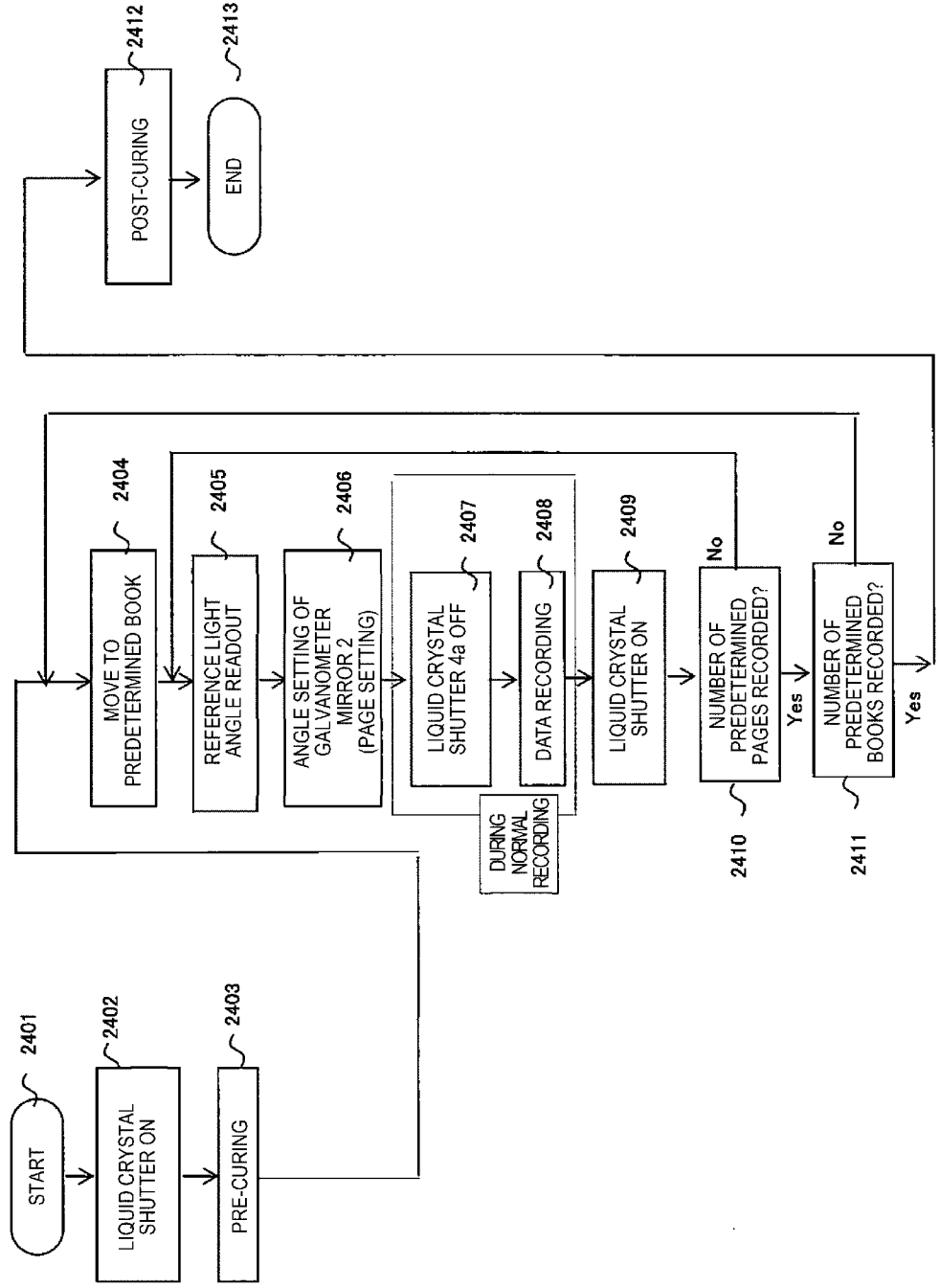

OPTICAL INFORMATION RECORDING AND REPRODUCING DEVICE, OPTICAL INFORMATION RECORDING AND REPRODUCING METHOD

TECHNICAL FIELD

The present invention relates to a device and a method for reproducing information from a recording medium using holography.

BACKGROUND ART

At present, optical discs having a recording capacity of approximately 50 GB can be commercialized for consumer use by a Blu-ray Disc™ standard using a blue-violet semiconductor laser. Hereafter, in optical disc, an increase in capacity has been also required to the same degree as an HDD (Hard Disk Drive) capacity of 100 GB to 1 TB.

However, in order to realize such an ultrahigh density in an optical disc, there is the need for high-density techniques based on different new methods which is distinguished from high-density techniques based on a reduction in the wavelength of a laser and an increase in NA of an objective lens.

During research on the next-generation storage techniques, a hologram recording technique for recording digital information using holography has attracted attention.

The hologram recording technique refers to a technique in which signal light having information of page data two-dimensionally modulated by a spatial light modulator is superimposed on reference light in the inside of a recording medium, and refractive index modulation is brought about within the recording medium by an interference fringe pattern which is generated at this time, to thereby record information on the recording medium.

During information reproduction, the irradiation of the recording medium with reference light used during recording causes holograms recorded in the recording medium to act like diffraction gratings to thereby generate a diffracted light. This diffracted light is reproduced as the same light inclusive of the recorded signal light and phase information.

The reproduced signal light is detected two-dimensionally at high speed using a photo-detector (camera) such as a CMOS or a CCD. In this manner, the hologram recording technique can record two-dimensional information on an optical recording medium at a time using one hologram, and can reproduce the information. Since a plurality of pieces of page data can be overwritten at a certain place of the recording medium, the technique can be used for recording and reproducing high-capacity and high-speed information.

As a hologram recording and reproducing technique, for example, JP-A-2006-172582 (PTL 1) is disclosed. This publication discloses that "in addition, a mechanical shutter 25 that opens and closes a beam during recording is disposed between a half-wave plate 24 and a polarization beam splitter 26, and a recording time is determined depending on the opening and closing timing of the mechanical shutter 25."

In addition, as the hologram recording and reproducing technique, for example, JP-A-2007-40414 (PTL 2) is disclosed. This publication discloses that "a pattern providing such polarized light as that in which all the signal light is shielded by a polarizing plate 14 for a period between data recording and data recording is displayed on a spatial modulator (SLM) 13 that performs spatial modulation on a signal light 100. Thereby, since the hologram recording material 50 is not irradiated with the signal light 100 between the recording and the recording, it is possible to prevent useless recording on the hologram recording material 50 from continuing. In addition, in this case, the spatial modulator 13 functions as a shutter, but its operation is rapid and a vibration does not occur therein. Therefore, it is possible to record a precise signal, and to make a transmission rate higher."

CITATION LIST

Patent Literatures

PTL 1: JP-A-2006-172582
PTL 2: JP-A-2007-4041

SUMMARY OF INVENTION

Technical Problem

Incidentally, when the mechanical shutter as disclosed in PTL 1 (hereinafter, referred to as the mechanical shutter) is used, the following problem occurs. First of all, when holograms are recorded on a disc at high speed in order to increase a transmission rate, the mechanical shutter has a limitation in a high-speed operation due to its own inertia, and thus opening and closing of the shutter does not follow a desired speed. Secondly, the mechanical shutter generates unnecessary vibration with respect to a light beam during high-speed opening and closing or during high-speed retreat and high-speed insertion operations. When holograms are recorded on the disc during this vibration, wave fronts to be recorded are disturbed, and thus it is difficult to record a precise information signal. For this reason, after the generation of the vibration is settled down, recording and reproduction has to be started, and thus it is difficult to cope with high-speed recording. In the worst case, a desired signal may not be able to be completely recorded. As a result, it takes time to open and close the mechanical shutter, which leads to a decrease in the transmission rate.

Consequently, PTL 2 discloses a configuration in which, in the shutter that selects the feasibility of data recording, a shutter function is appropriately provided in a combination of a liquid crystal display with a polarizing plate, rather than that in the mechanical shutter in which vibration may be generated.

However, a liquid crystal element has also the following problem when the element is used as a shutter of a hologram-type recording and reproducing device. First of all, it is difficult to maintain a liquid crystal to be in an ON or OFF state (rather than an ON or OFF state of a driving power supply) for a longer period of time at all times, for a reason of a deterioration in its life span, in view of a liquid crystal structure, and ON and OFF operations for a longer period of time are not able to be performed as a shutter function.

Secondly, since the liquid crystal element is disposed in an optical path of a light beam of a laser, and the liquid crystal element receives the light beam at all times, the liquid crystal element enters a "burned" state, and thus there is concern of a deterioration in the life span from the viewpoint of light resistance.

Consequently, the present invention is proposed in view of the above problems, and an object of the present invention is to provide an optical information recording and reproducing device having a shutter unit of which the life span is long and which is capable of performing high-speed recording and reproduction, and an optical information recording and reproducing method.

Solution to Problem

The above problems are solved by, for example, the invention according to claims.

Advantageous Effects of Invention

According to the present invention, it is possible to provide an optical information recording and reproducing device having a shutter unit of which the life span is long and which is capable of performing high-speed recording and reproduction, and an optical information recording and reproducing method.

BRIEF DESCRIPTION OF DRAWINGS

FIG. 4 is a schematic diagram illustrating the first embodiment of the optical information recording and reproducing device pick-up according to the present invention.

FIG. 5(a) is a schematic diagram illustrating the first embodiment of the optical information recording and reproducing device pick-up according to the present invention.

FIG. 5(b) is a schematic diagram illustrating the first embodiment of the optical information recording and reproducing device pick-up according to the present invention.

FIG. 6 is a schematic diagram illustrating the first embodiment of the optical information recording and reproducing device pick-up according to the present invention.

FIG. 7 is a schematic diagram illustrating the first embodiment of the optical information recording and reproducing device pick-up according to the present invention.

FIG. 8 is a schematic diagram illustrating the first embodiment of the optical information recording and reproducing device pick-up according to the present invention.

FIG. 9 is a schematic diagram illustrating the first embodiment of the optical information recording and reproducing device pick-up according to the present invention.

FIG. 10 is a schematic diagram illustrating the first embodiment of the optical information recording and reproducing device pick-up according to the present invention.

FIG. 11(a) is a schematic diagram illustrating a second embodiment of the optical information recording and reproducing device pick-up according to the present invention.

FIG. 11(b) is a schematic diagram illustrating the second embodiment of the optical information recording and reproducing device pick-up according to the present invention.

FIG. 12(a) is a schematic diagram illustrating the second embodiment of the optical information recording and reproducing device pick-up according to the present invention.

FIG. 12(b) is a schematic diagram illustrating the second embodiment of the optical information recording and reproducing device pick-up according to the present invention.

FIG. 13(a) is a schematic diagram illustrating a third embodiment of the optical information recording and reproducing device pick-up according to the present invention.

FIG. 13(b) is a schematic diagram illustrating the third embodiment of the optical information recording and reproducing device pick-up according to the present invention.

FIG. 14(a) is a schematic diagram illustrating the third embodiment of the optical information recording and reproducing device pick-up according to the present invention.

FIG. 14(b) is a schematic diagram illustrating the third embodiment of the optical information recording and reproducing device pick-up according to the present invention.

FIG. 15(a) is a schematic diagram illustrating the third embodiment of the optical information recording and reproducing device pick-up according to the present invention.

FIG. 15(b) is a schematic diagram illustrating the third embodiment of the optical information recording and reproducing device pick-up according to the present invention.

FIG. 16(a) is a schematic diagram illustrating the third embodiment of the optical information recording and reproducing device pick-up according to the present invention.

FIG. 16(b) is a schematic diagram illustrating the third embodiment of the optical information recording and reproducing device pick-up according to the present invention.

FIG. 17(a) is a schematic diagram illustrating the third embodiment of the optical information recording and reproducing device pick-up according to the present invention.

FIG. 17(b) is a schematic diagram illustrating the third embodiment of the optical information recording and reproducing device pick-up according to the present invention.

FIG. 18 is a schematic diagram illustrating the third embodiment of the optical information recording and reproducing device pick-up according to the present invention.

FIG. 19(a) is a diagram illustrating an embodiment of an operation flow of reproduction in the optical information recording and reproducing device.

FIG. 19(b) is a diagram illustrating an embodiment of an operation flow of recording in the optical information recording and reproducing device.

FIG. 19(c) is a diagram illustrating an embodiment of an operation flow of reproduction in the optical information recording and reproducing device.

FIG. 19(d) is a diagram illustrating an embodiment of an operation flow of reproduction in the optical information recording and reproducing device.

FIG. 20 is a diagram illustrating an embodiment of an operation flow of recording in the optical information recording and reproducing device.

FIG. 21 is a schematic diagram illustrating a fourth embodiment of the optical information recording and reproducing device pick-up according to the present invention.

FIG. 22 is a schematic diagram illustrating the fourth embodiment of the optical information recording and reproducing device pick-up according to the present invention.

FIG. 23 is a schematic diagram illustrating the fourth embodiment of the optical information recording and reproducing device pick-up according to the present invention.

FIG. 24 is a diagram illustrating an embodiment of an operation flow of recording in the optical information recording and reproducing device.

DESCRIPTION OF EMBODIMENTS

Hereinafter, examples of the present invention will be described with reference to the accompanying drawings.

Example 1

Figure 2:
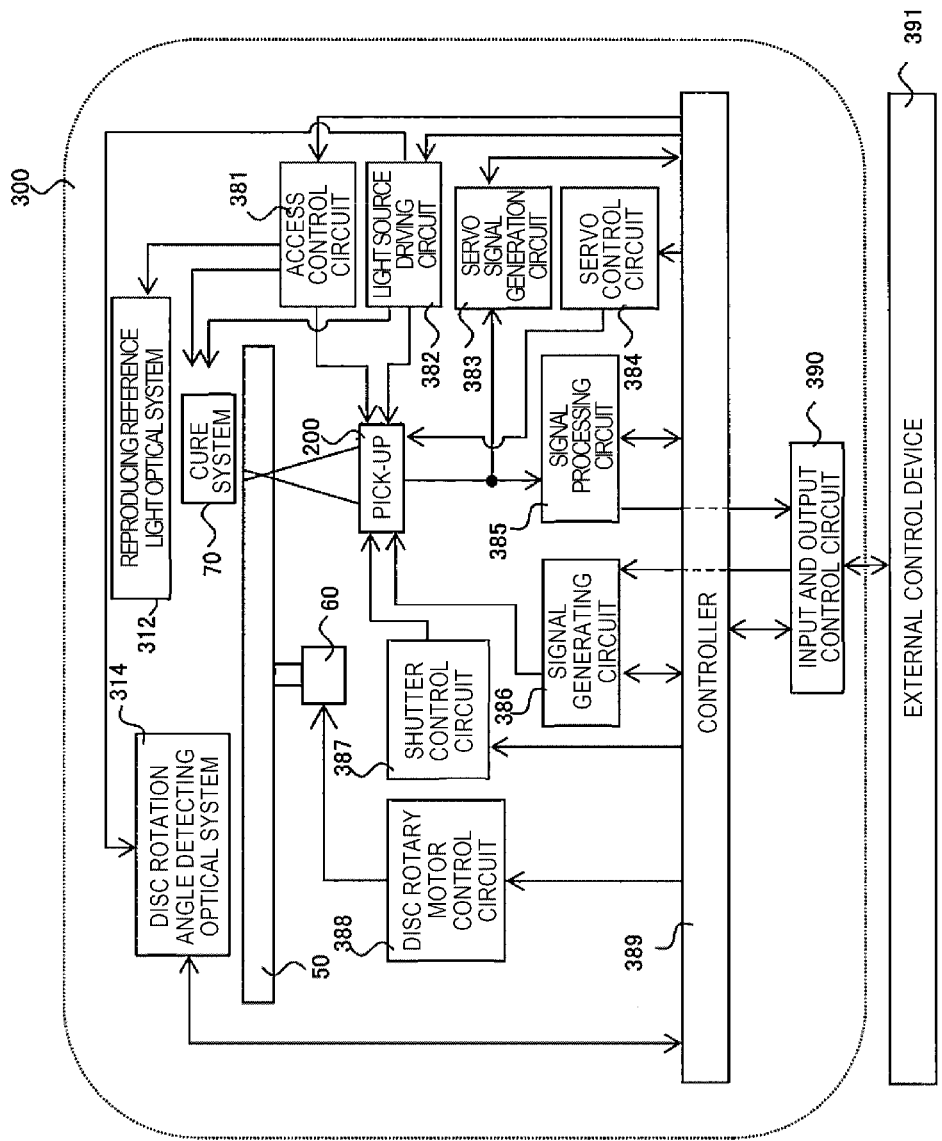
FIG. 2 is a block diagram illustrating an outline of the entirety of an optical information recording and reproducing device according to the first embodiment of the present invention.

Embodiments of the present invention will be described with reference to the accompanying drawings. FIG. 2 is a block diagram illustrating an optical information recording and reproducing device making use of an optical information recording medium that records and/or reproduces digital information using holography.

An optical information recording and reproducing device 300 is connected to an external control device 391 through an input and output control circuit 390. At the time of recording, the optical information recording and reproducing device 300 receives an information signal to be recorded from the external control device 391 through the input and output control circuit 390. In addition, at the time of reproduction, the optical information recording and reproducing device 300 sends a reproduced information signal to the external control device 390 through the input and output control circuit 390.

The optical information recording and reproducing device 300 includes a pick-up 200, a reproducing reference light optical system 312, a cure system 70, a disc rotation angle detecting optical system 314, a disc 50 which is an information recording medium, and a motor 60 that rotates the disc 50, the cure system 70, and the disc 50 is configured to be capable of being rotated by the motor 60.

The pick-up 200 plays a role in irradiating the disc 50 with reference light and signal light and recording digital information on the disc 50 using holography. In this case, the information signal to be recorded is sent to a spatial light modulator (hereinafter, referred to as SLM) within the pick-up 200 through a signal generating circuit 386 by a controller 389, and the signal light is modulated by the spatial light modulator.

When the information recorded on the disc 50 is reproduced, the reproducing reference light optical system 312 generates a light wave for causing the reference light emitted from the pick-up 200 to be incident on an optical information recording medium in an opposite direction to that during recording. The reproduced light which is reproduced by the reproducing reference light is detected by a photodetector (hereinafter, referred to as a camera), described later, within the pick-up 200, and a signal is reproduced by a signal processing circuit 385.

The irradiation time of the reference light (assigned reference number of 111 described later) and the signal light (assigned reference number of 101) with which the disc 50 is irradiated can be adjusted by the controller 389 controlling the opening and shutting time of a shutter portion 30 within the pick-up 200 through a shutter control circuit 387.

The cure system 70 plays a role in generating curing light beam (assigned reference number of 70a described later) which is used for pre-curing and post-curing the disc 50. The pre-curing refers to a pre-process of performing irradiation with a predetermined light beam in advance in order to achieve activation or the like of the disc before a desired position is irradiated with the reference light and the signal light when information is recorded on the desired position within the disc 50. The post-curing refers to a post-process of recording information on a desired position within the disc 50 and then performing irradiation with a predetermined light beam for fixing so as not to be capable of being additionally recorded on the desired position.

The disc rotation angle detecting optical system 314 is used for detecting a rotation angle of the disc 50. When the disc 50 is adjusted to have a predetermined rotation angle, a signal depending on the rotation angle is detected by the disc rotation angle detecting optical system 314, and the rotation angle of the disc 50 is controlled using the detected signal through a disc rotary motor control circuit 388 by the controller 389.

A predetermined light source driving current is supplied from a light source driving circuit 382 to light sources within the pick-up 200, the cure system 70, and the disc rotation angle detecting optical system 314, and a light beam having a predetermined light intensity can be emitted from each of the light sources.

In addition, the pick-up 200 and the cure system 70 of the disc are provided with a mechanism (not shown) which is capable of sliding the position of the disc 50 in a radial direction, and the position of the disc is controlled through an access control circuit 381.

Incidentally, a recording technique using a principle of angle multiplexing in holography has a tendency for a tolerance for a shift in a reference light angle to decrease considerably.

Therefore, it is necessary to provide a mechanism for detecting the shift amount of the reference light angle, within the pick-up 200, to generate a servo controlling signal in a servo signal generation circuit 383, and to provide a servo mechanism for correcting the shift amount through a servo control circuit 384, within the optical information recording and reproducing device 300.

Here, the pick-up 200, the cure system 70, and the disc rotation angle detecting optical system 314 may be simplified by integrating some of the optical system configurations or all the optical system configurations into one configuration.

Figure 1:
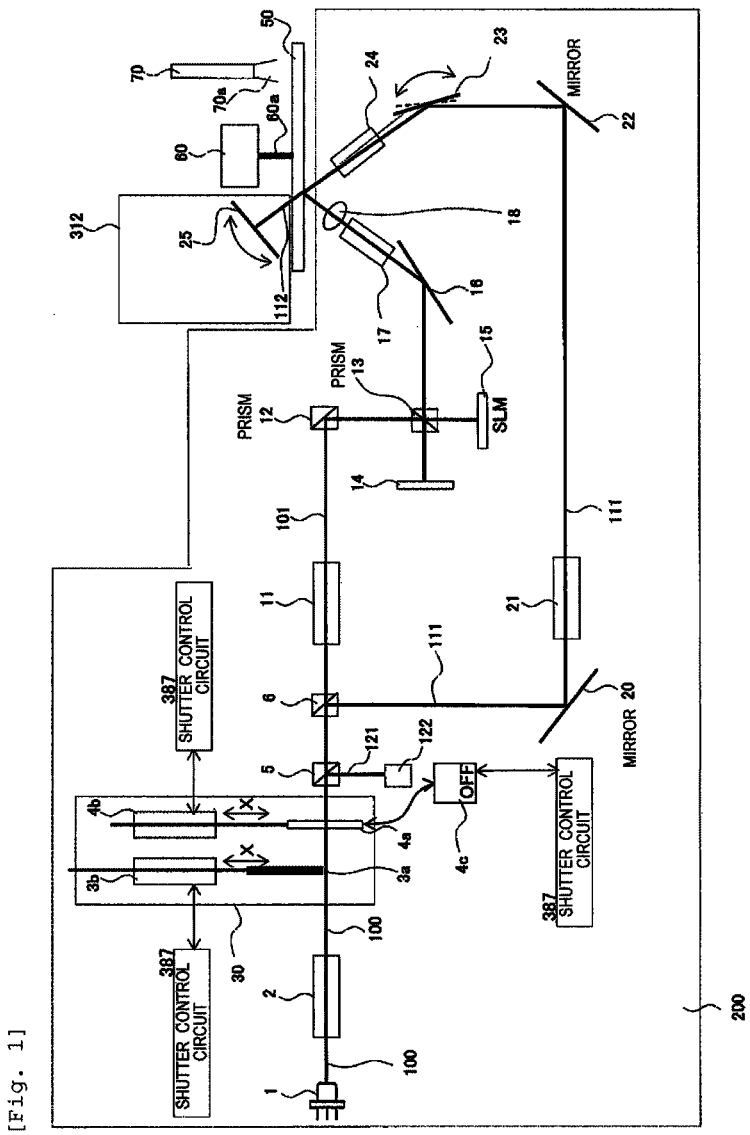
FIG. 1 is a schematic diagram illustrating a first embodiment of an optical information recording and reproducing device pick-up according to the present invention.

FIG. 1 is a diagram illustrating a recording principle in an example of a basic optical system configuration of the pick-up 200 in the optical information recording and reproducing device 300 (described above in FIG. 2) illustrating a first embodiment of the present invention. A light beam 100 emitted from a laser light source 1 passes through an optical system 2, and is incident on the shutter portion 30. Here, as described above, the shutter portion 30 is constituted by a mechanical shutter 3a and a liquid crystal shutter 4a using a liquid crystal element. The mechanical shutter 3a and the liquid crystal shutter 4a are configured to be able to be moved in an X-direction by an actuator described later so as to shield and transmit the light beam 100. In addition, a prism 5 is disposed at the rear of the liquid crystal shutter 4a. The shutter portion has a function of shielding a light beam through a combination with the prism 5 when the liquid crystal shutter 4a is set to be an ON state by a liquid crystal ON/OFF control circuit 4C (when FIG. 1 is set to be an OFF state).

The light beam 100 passing through the prism 5 is branched into light which travels straight toward a PBS prism described later and light 121 which is bent in a substantially right-angled direction by the prism 5, and it is detected by a sensor 122 whether the shutter portion 30 performs a predetermined operation. This sensor 122 may be a sensor which can detect the operation of the shutter portion, and a type, a structure, and a detection method are not particularly limited. An example of the sensor may include a general light receiving element, a photo-detector, a front monitor, or the like.

Here, in the state of FIG. 1, that is, in a state where the mechanical shutter 3a is in an Open state, that is, the shutter is in an OFF state, and in a state where the liquid crystal shutter 4a is in an OFF state, the light beam 100 passes through the both shutters. That is, when the shutter 30 is opened, the light beam 100 passes through the shutter 30, and passes through the prism 5 disposed at the rear of the shutter. Thereafter, a polarization direction is controlled so that a light intensity ratio between p-polarized light and s-polarized light is set to have a desired ratio by, for example, an optical element, not shown, which is constituted by a ½ wavelength plate or the like, and then the light beam is incident on a PBS (Polarization Beam Splitter) prism 6.

Here, the shutter portion 30 in the present example will be described in detail. The shutter portion 30 constituted by the mechanical shutter 3a that mechanically performs at least one or more operations such as a reciprocating motion, a rotational motion, and an opening and closing operation, an actuator 3b for driving the mechanical shutter 3a and shielding or transmitting the light beam. 100 emitted from the laser light source 1, the shutter control circuit 387 that controls the actuator 3b, the liquid crystal shutter 4a that transmits and shield a light beam using a liquid crystal element, a liquid crystal ON/OFF control circuit 4c that performs ON/OFF control on the liquid crystal shutter 4a itself, a shutter control circuit 387 that controls the liquid crystal ON/OFF control circuit 4c, a liquid crystal shutter moving actuator 4b for (mechanically) retreating the liquid crystal shutter 4a from an optical path of the light beam 100, and a shutter control circuit 387 that controls the actuator 4b. Meanwhile, for the purpose of simplification, a description is given in which the control of the actuator 3b, the actuator 4b, and the liquid crystal ON/OFF control circuit 4c is performed by the shutter control circuits 387, but the control thereof may be, of course, performed using separate circuits.

With these configurations, as described above, the mechanical shutter 3a and the liquid crystal shutter 4a can be moved in the X-direction so as to be capable of shielding and transmitting the light beam 100.

Meanwhile, in the present invention, the arrangement order of the mechanical shutter 3a and the liquid crystal shutter 4a may be a reverse order without being limited thereto. However, it is preferable that the mechanical shutter 3a be disposed closer to the laser light source side than the liquid crystal shutter 4a from the viewpoint of a decrease in the influence of "liquid crystal burning" due to the laser light source and an increase in the life span of the liquid crystal shutter.

In addition, here, the shutter control circuit 387 is the same as that described in FIG. 2.

In addition, the details of operation patterns of the mechanical shutter 3a and the liquid crystal shutter 4a will be described later.

The signal light 101 and the reference light 111 are branched by the PBS prism 6. Next, the light beam passing through the PBS prism 6 serves as the signal light 101. After a light beam diameter is expanded by an optical system 11, for example, a beam expander which is not shown, the light beam passes through PBS prisms 12 and 13 via a phase mask and a relay lens, and is incident on an SLM 15.

A signal light to which information is added by the SLM 15 is reflected from the (PBS) prism 13, and passes through an optical system 17 while its optical path is adjusted via, for example, a mirror 16. Here, the optical system 17 is configured to include a relay lens (not shown) and a spatial filter 314 as an example. Thereafter, the signal light 101 is condensed onto the disc 50 by an objective lens 18.

On the other hand, the light beam reflected from the PBS prism 6 serves as the reference light 111. After its direction is changed by a mirror 20, the light beam is set to have a predetermined polarization direction during recording or reproduction by passing through an optical system 21 which is constituted by a polarization direction conversion element (not shown) and the like, and then is incident on a galvanometer mirror 25 via a mirror 22. Since the angle of a galvanometer mirror 23 can be adjusted by an actuator (not shown), the incidence angle of the reference light which passes through an optical system 24 and then is incident on the disc 1 can be set to a desired angle. Meanwhile, in order to set the incidence angle of the reference light, an element that converts the wave front of the reference light may be used instead of the galvanometer mirror.

In this manner, the signal light and the reference light are caused to be incident on the disc 50 so as to be superimposed on each other, to thereby form an interference fringe pattern within the disc 50 which is a recording medium, and information is recorded by writing this pattern on the recording medium. In addition, since the incidence angle of the reference light which is incident on the disc 50 can be changed by the galvanometer mirror 23, it is possible to perform recording based on angle multiplexing.

Hereafter, in holograms which are recorded on the same region by changing reference light angles, a hologram corresponding to an individual reference light angle is called a page, and a set of pages on which angle multiplexing is performed in the same region is called a book.

Figure 3:
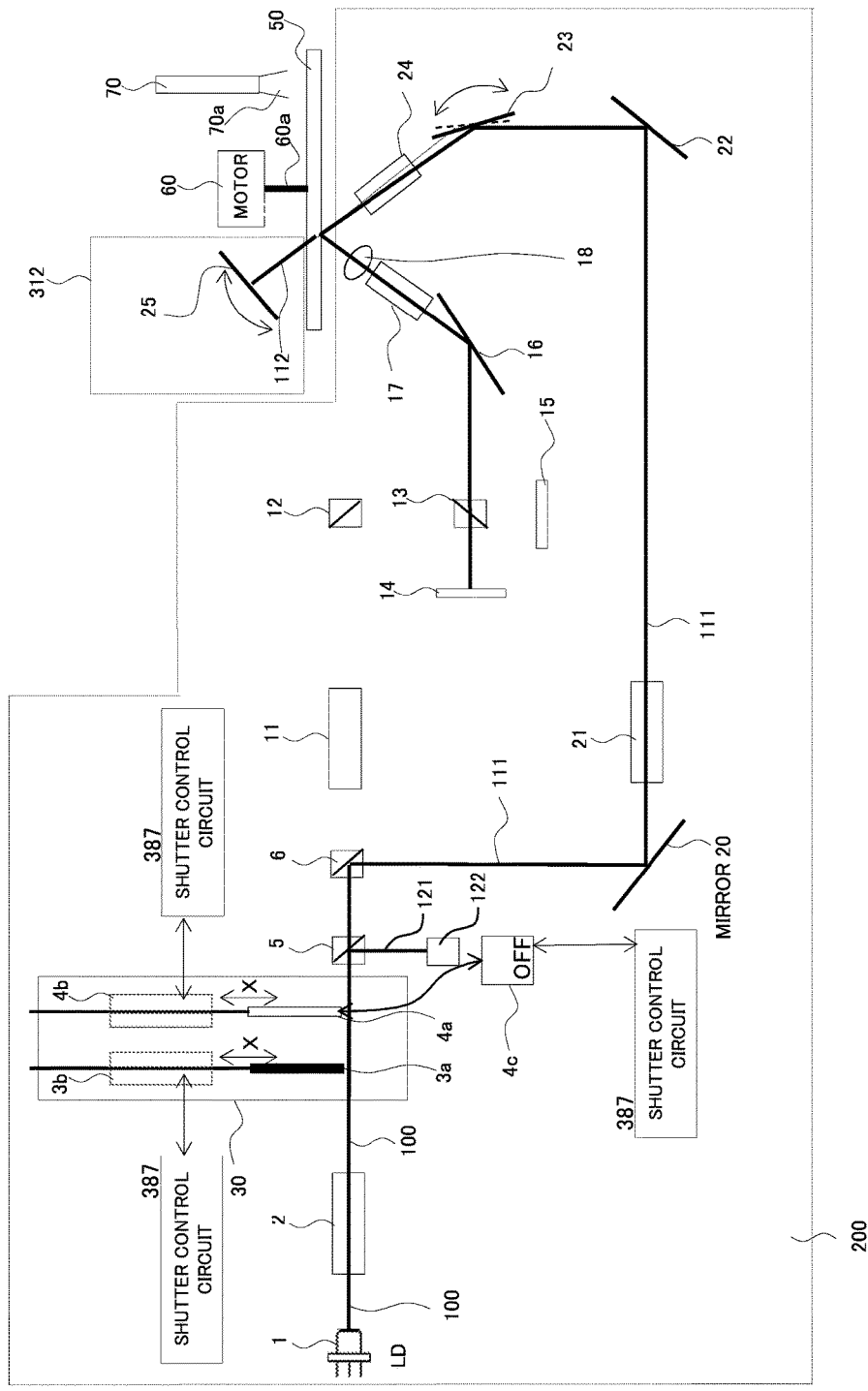
FIG. 3 is a schematic diagram illustrating the first embodiment of the optical information recording and reproducing device pick-up according to the present invention.

FIG. 3 is a diagram illustrating a reproduction principle in an example of a basic optical system configuration of the pick-up 200 in the optical information recording and reproducing device 300. When recorded information is reproduced, the reference light is incident on the disc 50 as described above, and the light beam passing through the disc 50 is reflected by the galvanometer mirror 25 of which the angle can be adjusted by an actuator (not shown), to thereby generate the reproducing reference light thereof.

The reproduced light which is reproduced by this reproducing reference light propagates through the objective lens 18 and the optical system 17 which is constituted by a relay lens (not shown), a spatial filter and the like. Thereafter, the reproduced light passes through the (PBS) prism 13 and is incident on a photo-detector (hereinafter, referred to as a camera) 14, thereby allowing the recorded signal to be reproduced. As the camera 14, an imaging device such as, for example, a CMOS image sensor or a CCD image sensor can be used, but any element may be used insofar as page data can be reproduced.

Hereinafter, operating modes of the mechanical shutter and the liquid crystal shutter described above will be described with reference to FIGS. 4 to 10.

FIG. 4 is a diagram obtained by extracting the shutter portion 30 which is surrounded by a broken line shown in FIGS. 1 and 3, for the purpose of description. FIG. 4 shows a state in which both the mechanical shutter 3a and the liquid crystal shutter 4a are retreated by the mechanical shutter retreating actuator 3b and the liquid crystal shutter moving actuator 4b, respectively, so as not to shield the light beam 100 during a reproducing mode. In addition, FIG. 4 shows that the liquid crystal shutter 4a itself is also set to be in an OFF state by the ON/OFF control circuit (state of FIG. 3 described above).

FIG. 5(a) shows that the mechanical shutter is in an ON state, the liquid crystal shutter is inserted into the optical path of the light beam, and the liquid crystal shutter is in an OFF state. As a result, the light beam 100 is set to be in a shielding state.

FIG. 5(b) shows that the mechanical shutter is in an ON state, the liquid crystal shutter is retreated with respect to the optical path of the light beam, and the liquid crystal shutter is in an OFF state. As a result, the light beam 100 is set to be in a shielding state.

In this manner, the mechanical shutter is located closer to the emission source side of the light beam (located closer to the laser light source side (not shown)) than the liquid crystal shutter. Therefore, when the mechanical shutter 3a is in an ON state, that is, operates so as to shield the optical path of the light beam, it is possible to shield the light beam irrespective of the operating mode of the liquid crystal shutter.

In addition, in FIGS. 5(a) and 5(b), the liquid crystal shutter is in an OFF state, but may transition to an ON state due to no involvement in the shielding of the light beam.

In addition, considering a state where the liquid crystal shutter 4a is inserted into the optical path of the light beam, and a state where the mechanical shutter 3a is retreated from the optical path of the light beam, the liquid crystal shutter 4a is irradiated with the light beam at all times regardless of the ON/OFF state thereof, and thus there is the possibility of the liquid crystal element of the liquid crystal shutter being damaged particularly when the light beam is light emitted from a high-output laser. For this reason, for example, during reproduction, this structure in which the liquid crystal shutter is retreated from the light beam is effective in order not to apply the light beam to the liquid crystal shutter unnecessarily for a longer period of time.

FIGS. 6 and 7 are diagrams illustrating a separate mode of the shutter 30. Here, as an example, states during a recording mode are shown.

The above drawings show that the mechanical shutter 3a is retreated, that is, in an OFF state, the liquid crystal shutter is inserted into the optical path of the light beam because the light beam 100 is required to be transmitted up to the disc, and the liquid crystal shutter is also in an OFF state for information recording.

On the other hand, FIG. 7 shows a status during a recording mode, but during page movement in which information is not recorded on the disc, or during book movement. This drawing shows a status in which, while the mechanical shutter 3a is in an OFF state similarly to FIG. 6, recording is temporarily stopped during page movement of recording information or during book movement, and thus the liquid crystal shutter having rapid ON/OFF responsiveness is inserted into the optical path, and the liquid crystal shutter is set to be in an ON state. Particularly, the page movement realizes high-speed recording of information, for example, is performed at high speed in μ (micro) seconds. Therefore, the mechanical shutter having inertia is not able to follow a high-speed shutter operation, and an unnecessary vibration which is associated with an increase in speed occurs in the mechanical shutter, which leads to a hindrance to high-speed recording of information.

Further, in a case of the optical information recording and reproducing device, there are the following modes in addition to the reproduction and recording modes.

(1) Mode in which power-on is performed and the device itself is set to be in an ON state for the purpose of laser stabilization,
(2) Standby mode in which recording or reproduction stands by after laser stabilization in the above (1),
(3) Mode in which the disc is loaded or unloaded into or from the device, and
(4) Mode in which the disc is cured.

In the mode of the above (1) to (4), unnecessary light beam with which the disc is irradiated has to be shielded.

Here, FIGS. 8 to 10 show examples in which the preferred states of the shutters for various types of modes of the optical information recording and reproducing device are arranged.

FIG. 8 is a diagram in which the states of the mechanical shutter and the liquid crystal shutter in the device states of the above (1) to (4) are collected, FIG. 9 is a diagram in which the states of the mechanical shutter and the liquid crystal shutter during recording are collected, and FIG. 10 is a diagram in which the states of the mechanical shutter and the liquid crystal shutter during reproduction are collected.

Here, FIGS. 5(a) and 5(b) described above show diagrams in which the liquid crystal shutter 4a is in an OFF state. However, since the mechanical shutter 3a is in an ON state, this liquid crystal shutter may be in any state from the viewpoint of the shielding the light beam even when the liquid crystal shutter 4a is in an ON state or an OFF state, and even when the liquid crystal shutter 4a is in an inserted state or a retreated state. Consequently, an appropriate state of an ON/OFF state or an inserted/retreated state may be selected for the device in view of controllability, the heat-generation state of the liquid crystal element having small power consumption, and the like. Meanwhile, the liquid crystal shutter may be retreated during power-on, during standby, and during loading. Thereby, when the next operation is a reproduction process, it is possible to rapidly start a reproduction operation which is next performed.

In addition, when curing is performed, particularly, when pre-curing is performed, the liquid crystal shutter may be inserted into the optical path. Thereby, it is possible to rapidly start a recording operation which is next performed.

As described above, by utilizing mutual features between the mechanical shutter for realizing high stability, reliability, and a long life span by disposing the mechanical shutter and the liquid crystal shutter in combination with each other, and the liquid crystal shutter capable of performing the ON/OFF operation of the high-speed liquid crystal element, it is possible to cope with high stability, reliability, a long life span, and higher-speed recording, with respect to the optical information recording and reproducing device.

Here, an operation flow of the mechanical shutter and the liquid crystal shutter according to the present example will be described with reference to FIG. 19.

FIG. 19 is a diagram illustrating an operation flow of recording and reproduction in the optical information recording and reproducing device 300 using holography.

FIG. 19(a) is a diagram illustrating an operation flow until the disc 50 which is an optical information recording medium is inserted into the optical information recording and reproducing device 300 and then preparation for recording or reproduction is completed, FIG. 19(b) is a diagram illustrating an operation flow until information is recorded on the optical information recording medium 1 from a ready state, and FIG. 19(c) is a diagram illustrating an operation flow until the information recorded on the disc 50 is reproduced from the ready state.

In addition, FIG. 19(d) illustrates a detailed flow of shutter mode setting 601 shown in FIG. 19(a).

As shown in FIG. 19(a), when the disc 50 is inserted, a process of the optical information recording and reproducing device 300 is started (600). First, in order to determine what kind of disc the disc 50 corresponds to, since the disc enters a disc signal reading mode, that is, a reproducing mode, the state shown in FIG. 10 is selected in the shutter 30 (601). The optical information recording and reproducing device 300 performs, for example, disc determination of whether the inserted disc-like medium is a medium for recording or reproducing digital information using holography (602).

When it is determined that the result of the disc determination is a disc for recording or reproducing digital information using holography, the optical information recording and reproducing device 300 reads out control data which is provided in the disc 50 (603), and acquires, for example, information on the disc 50, for example, information on various setting conditions during recording or during reproduction.

After the read-out of the control data, various adjustments according to the control data or a learning process (604) relating to the pick-up 200 is performed, and the mechanical shutter 3a and the liquid crystal shutter 4a in the shutter 30 continue the learning process in the reproducing mode and/or the recording mode while determining (605) the shutter operation pattern during reproduction shown in FIG. 10. When the learning process (604) is terminated, the optical information recording and reproducing device 300 completes the preparation for recording or reproduction (606).

In the operation flow until information is recorded from the ready state, as shown in FIG. 19 (b), the setting of the shutter 30 is first set to the recording mode shown in FIG. 9 (611), data to be recorded is received (612), and information according to the data is sent to the spatial light modulator (SLM) 15 within the pick-up 200.

Thereafter, in order to be able to record high-quality information on the optical information recording medium, various recording learning processes such as, for example, the power optimization of the laser light source 1 and the optimization of the exposure time based on the shutter 30 are previously performed as necessary (613).

Thereafter, the access control circuit 381 is controlled in a seek operation (614), and the disc 50 is located at a predetermined position with respect to the positions of the pick-up 200 and the cure system 70. The setting of the shutter mode during this seek operation is generally the same as that of the mode during reproduction. When the disc 50 has address information (TOC (Table Of Contents) in a CD or a DVD), the address information is reproduced to confirm whether the disc is located at an object position, and when the disc is not disposed at the object position, the amount of shift between the object position and a predetermined position is calculated, and a locating operation is repeated again.

On the other hand, while the disc 50 has the TOC information, the TOC information on the disc is read initially during the seek operation, and the disc 50 is brought close to a predetermined position with respect to the positions of the pick-up 200 and the cure system 70 up to the predetermined position (during coarse adjustment), the shutter may be in an ON state.

Thereafter, in order to perform pre-curing on a predetermined region using light beam 70a which is emitted from the cure system 70 (616), the shutter 30 previously sets the shutter mode to a curing mode shown in FIG. 8 (615). After the pre-curing (616) is performed, the shutter 30 sets the shutter mode to the recording mode shown in FIG. 9 (617). Data is then recorded using the signal light 101 and the reference light 111 which are emitted from the pick-up 200 (6168).

After the data is recorded, the shutter mode is set to the curing mode shown in FIG. 8 again (619), and post-curing is performed using the light beam 70a which is emitted from the cure system 70 (620). Here, the data may be verified as necessary.

In an operation flow until the recorded information is reproduced from the ready state, as shown in FIG. 19(c), the shutter mode is first set (631) for the seek operation (632). Here, the shutter mode for the seek operation (632) is generally the same as the reproducing mode shown in FIG. 10. In the seek operation (632), the access control circuit 381 is controlled, and the disc 50 is located at a predetermined position of the reproducing reference light optical system including the pick-up 200 and the optical systems 21 and 24. When the disc 50 has the address information, the address information is reproduced to confirm whether the disc is located at the object position, and when the disc is not disposed at the object position, the amount of shift between the object position and a predetermined position is calculated, and a locating operation is repeated again.

Thereafter, the reference light is emitted from the pick-up 11, the information recorded on the optical information recording medium is read out (633), and reproduced data is transmitted (634).

Next, an operation flow until the optical information recording and reproducing device 300 is powered-on and then recording or reproduction is started will be described with reference to FIG. 19(d).

After the device is powered-on (640), the shutter 30 sets the shutter mode to a power-on mode shown in FIG. 8 (641). In the optical information recording and reproducing device according to the present example, when the light beam is emitted from the laser light source by power-on of the device, the wavelength or power of the light beam is monitored by, for example, an optical monitor of a laser light source portion (not shown), the wavelength or power required for recording and reproduction is stabilized (Yes in 642), and then the setting of the shutter mode is caused to transition to the reproducing mode shown in FIG. 10. This is because the irradiation of the disc 50 with the light beam in a state where the power or wavelength of the light beam is unstable does not allow signal information to be precisely exchanged.

Meanwhile, the stability of the wavelength or power may be set to be, for example, a case where the wavelength or power of the laser is within a range of predetermined errors. Alternatively, a configuration may be used in which it is determined that the wavelength or power of the light beam is stabilized when the device is powered-on or the laser light source is turned on and then a predetermined time has elapsed without monitoring the wavelength or power.

In addition, with a configuration as shown in FIG. 19(d), it is possible to extend the life span of the liquid crystal element or the like, in a device requiring a lot of time until the wavelength or power of the laser is stabilized.

Next, a shutter operation during movement between pages of hologram will be described. In the optical information recording and reproducing device using hologram, for example, one or a plurality of reference light angles corresponding to each page are calculated in advance, or are contained as data in a table. The reference light angle data and the table are provided in, for example, the controller 389, the servo signal generation circuit 383, and the servo control circuit 384. In the present embodiment, particularly, during data recording, the shutter performs ON/OFF driving on only the liquid crystal shutter in a state where the mechanical shutter is retreated. In that case, after the angle of the galvanometer mirror 23 shown in FIG. 1 which is set to have a certain reference light angle is determined, the liquid crystal shutter is set to be in an OFF state, the disc 50 is irradiated with the signal light 101 and the reference light 111, and interference is caused, which results in the formation of a page of one hologram. Subsequently, when a hologram of the next page is formed, the liquid crystal shutter is set to be in an ON state, that is, the light beam is set to be in a shielded state, and then the galvanometer mirror 23 has the angle thereof changed to the next angle position. When the angle is determined, the liquid crystal shutter is set to be in an OFF state again, that is, the disc 50 is irradiated with the signal light 101 and the reference light 111, and subsequently, a page of a new hologram is formed. This operation is repeated, and thus a hologram of a plurality of pages which are set in advance is formed.

A description will be given with reference to a flow of FIG. 20. FIG. 20 is a diagram illustrating the details of the shutter mode setting (recording mode) (617) and the data recording (618) in FIG. 19(b).

After the process of the pre-curing (616), that is, the activation of the disc recording portion is achieved, as the shutter mode setting (recording mode) (617), the mechanical shutter 3a having large inertia is retreated once again for the purpose of preparation for recording (617(a)), and the liquid crystal shutter is closed (ON state) (617(b)). Subsequently, as the data recording (618), the position of the motor 60 that rotates the disc is accurately moved so that a predetermined position (book position) on the disc at which data is recorded is irradiated with the signal light 101 and the reference light 111 (618(a)). Next, angle data for controlling the galvanometer mirror 22 is read in order to correspond to a page position at which a hologram is formed on the disc 50, and to control the reference light angle (618(b)), and angle setting of the galvanometer mirror 2, that is, page setting is performed (618(c)). For example, an angle at which the reference light is incident on the disc is set to a first angle.

Subsequently, the liquid crystal shutter 4a is set to be in an OFF state (618 (d)), and the light beam is transmitted to thereby form a hologram on the disc (618 (e)). When the recording of one piece of page data is terminated, the liquid crystal shutter transitions to an ON state, that is, a light-shielding state, and the necessity (618 (g)) of the next page recording is determined. Here, the incidence angle of the reference light corresponding to the next page is set to a second reference light angle different from the first angle. The recording book is then confirmed (618 (h)), and a post-curing process is performed (619). The process is then terminated (620).

In this manner, according to the flow as shown in FIG. 20, it is possible to perform a recording operation at high speed, and to achieve an increase in the life span of the liquid crystal element.

Here, in the first embodiment, an example has been described in which the shutter which is disposed in combination with the mechanical shutter is used, and the liquid crystal element which is an electronic device, that is, the liquid crystal shutter is used, but the application of the present invention is not limited to the liquid crystal element, and a combination of a shutter using, for example, electronic paper or LCOS (Liquid Crystal on Silicon) may be used. This is true of the following example.

As described above, according to the present example, it is possible to provide an optical information recording and optical information producing device having a shutter unit having a long life span and high reliability and stability.

In addition, since the shutter portion 30 is disposed between the laser light source and the prism by which the signal light and the reference light are branched, the signal light 101 and the reference light 111 can be shielded or transmitted collectively, and thus it is possible to prevent the disc from reacting carelessly due to the irradiation of the disc 50 with signal light 101 or the reference light 111 when unnecessary.

Example 2

Subsequently, a second embodiment will be described with reference to FIGS. 11(a) and 11(b) and FIGS. 12(a) and 12(b).

FIGS. 11(a) and 11(b) and FIGS. 12(a) and 12(b) show diagrams in which the mechanical shutter portion described above is replaced by a separate form. Here, FIGS. 11(a) and 12(a) are diagrams when a mechanical shutter of the second embodiment is seen from the light beam irradiation side, whereas FIG. 11(b) and FIG. 12(b) are diagrams when the mechanical shutter is seen from a direction substantially orthogonal to the light beam irradiation direction likewise.

100 is a light beam which is emitted from a laser light source (not shown), 151 is a mechanical shutter, 150 is a rotating or revolving actuator for driving the mechanical shutter, and 150a is a rotating or revolving shaft of the rotating or revolving actuator. And the above components are fixed integrally with the mechanical shutter 151 by the shaft 150a.

FIGS. 11(a) and 11(b) are diagram in which the light beam 100 is shielded by the mechanical shutter 151, that is, the mechanical shutter is in an ON state, and FIGS. 12(a) and 12(b) show diagrams in which the rotating or revolving shaft 150a of the actuator 150 moves in a direction of arrow B. In this case, the mechanical shutter is in an OFF state, and the light beam 100 travels without being shielded by the mechanical shutter 151.

The subsequent traveling of the light beam 100 is the same as that in the above-mentioned first embodiment, and the same combination operation can also be performed in the mechanical shutter and the liquid crystal shutter based on the transition of the device modes shown in FIGS. 8 to 10 described above. In the second embodiment, it is also possible to realize the same effect as that in the above-mentioned first embodiment.

In the second embodiment, since the device can be made thinner in the thickness direction of the light beam than in the first embodiment, and the mechanical shutter driving actuator and the liquid crystal shutter moving actuator are used in common, effects of a reduction in the thickness of the device and a reduction in cost due to a reduction in the number of components are also obtained.

Example 3

Subsequently, a third embodiment will be described with reference to FIGS. 13(a) and 13(b), FIGS. 14(a) and 14(b), FIGS. 15(a) and 15(b), FIGS. 16(a) and 16(b), and FIGS. 17(a) and 17(b).

Here, 3c is a liquid crystal shutter which is constituted by a liquid crystal element, and 3d is a mechanical shutter which is constituted by a light shielding plate or the like. The liquid crystal shutter 3c and the mechanical shutter 3d are structurally configured integrally with each other, and are disposed substantially orthogonally to the light beam 100. In addition, 3e is a mechanical shutter/liquid crystal shutter switching actuator for retreating or inserting a unit having the liquid crystal shutter 3c and the mechanical shutter 3d formed integrally, in a X-direction in the drawings with respect to the light beam 100.

In FIGS. 13(a) and 13(b), the shown mode of the optical information recording and reproducing device is equivalent to the recording mode shown in FIG. 9. FIG. 13(a) shows that the liquid crystal shutter is inserted into the optical path of the light beam in the mechanical shutter OFF during normal recording, and the liquid crystal shutter is in an OFF state. FIG. 13(b) shows that the liquid crystal shutter is in an ON state in the mechanical shutter OFF during page movement or during book movement.

In FIGS. 14(a) and 14(b), the shown mode of the optical information recording and reproducing device is equivalent to each mode (power-on, standby, disc loading, or curing) of the device shown in FIG. 8 described above. FIG. 14(a) shows that in each mode of FIG. 8, the mechanical shutter 3d is in an ON state and an inserted state with respect to the optical path of the light beam 100, and the liquid crystal shutter 3c is in an OFF state. Likewise, FIG. 14(b) shows that in each mode of FIG. 8, the mechanical shutter 3d is in an ON state, and the liquid crystal shutter 3c is in an ON state.

In FIG. 14(b), as is the case with the first embodiment, the liquid crystal shutter 3c may be in any of an ON state or an OFF state from the viewpoint of the shielding of the light beam, but an appropriate state of any of an ON/OFF state may be selected for the device in view of controllability, the heat-generation state of the liquid crystal element having small power consumption, and the like.

FIGS. 15(a) and 15(b) show a status in which both the liquid crystal shutter 3c and the mechanical shutter 3d are retreated from the light beam 100 by the mechanical shutter/liquid crystal shutter switching actuator 3e, and this shows a status during the reproducing mode of FIG. 10 described above.

FIGS. 16(a) and 16(b) and FIGS. 17(a) and 17(b) have configurations in which the positions of the mechanical shutter and the liquid crystal shutter are replaced with each other in FIGS. 14(a) and 14(b) and FIGS. 13(a) and 13(b), respectively, and each mode of the device to be used is the same as each case of FIG. 14 (that is, FIG. 8) and FIG. 13 (that is, FIG. 9), and thus the description herein will not be given.

In addition, FIGS. 13 to 14 show structures in which the mechanical shutter and the liquid crystal shutter are moved in a slide manner by a reciprocating mechanical shutter/liquid crystal shutter switching actuator, but there is no limitation thereto. Even when a structure is used in which the liquid crystal shutter is incorporated into a portion of a disc-like plate, and a hole for transmitting the light beam is likewise provided on the concentric circle with the liquid crystal shutter, and even when a structure is used in which the central shaft of the disc is rotated, a similar effect can be obtained. A schematic diagram having such a form is shown in FIG. 18. In FIG. 18, 180 is a disc shutter, 181 is a rotating shaft (revolving shaft) of a rotating or revolving actuator (not shown), 182 is a liquid crystal shutter, 183 is a through-hole which is provided on the disc shutter, and 100 is a light beam. In FIG. 18, the light beam 100 passes through the through-hole 182, and is branched into signal light and/or reference light which is not shown below.

When rotation (revolution) control of the disc shutter 180 and ON/OFF control of the liquid crystal shutter 182 are performed so as to correspond to each mode of the device described so far, the same effects as those in the first to third embodiments can be obtained.

With the above configuration, it is possible to realize a shutter unit capable of achieving high reliability, high stability, and high-speed driving, and to realize high reliability, high stability, and high-speed information recording with respect to the optical information recording and reproducing device.

Here, in the third embodiment, as compared to the first embodiment and the second embodiment, an effect is obtained in which a reduction in cost can be achieved due to the structure thereof can be simplified and the maintenance thereof is also facilitated.

Example 4

Subsequently, a fourth embodiment will be described. FIG. 21 is a diagram illustrating an optical system configuration of a pick-up 200 corresponding to Example 4, and is different from FIG. 1, in that there is no actuator 3b for driving the mechanical shutter 3a and the mechanical shutter 3a. That is, the shutter unit does not include the mechanical shutter and includes the liquid crystal shutter. There is no difference in the optical system therebetween except for this point as compared to FIG. 1, and thus the description thereof will not be given.

FIG. 22 is a diagram in which the states of the liquid crystal shutter during recording are collected, and FIG. 23 is a diagram in which the states of the liquid crystal shutter during reproduction are collected. During recording, the liquid crystal shutter is inserted into the optical path. During reproduction, the liquid crystal shutter is moved by the actuator 4b and thus is retreated from the optical path.

FIG. 24 shows an example a flow during recording. When the process is started (2401), the liquid crystal shutter is set to be in an ON state (2402), and pre-curing (2403) is performed. Next, the position of the motor 60 for rotating on the optical information recording medium 50 is moved so that a target book position at which data is recorded on the optical information recording medium is irradiated with the signal light 101 and the reference light 111 (2404). Meanwhile, the target position becomes a region on which pre-curing is performed in 2403.

Next, in order to record page data on the optical information recording medium 50, angle data for controlling the galvanometer mirror 22 is read for controlling the reference light angle (2405). Angle setting of the galvanometer mirror 2, that is, page setting is performed (2406). For example, an angle at which the reference light is incident on the disc is set to a first angle.

Subsequently, the liquid crystal shutter 4a is set to be in an OFF state (2407), and the light beam is transmitted to thereby form data on the optical information recording medium (2408). When the recording of one piece of page data is terminated, the liquid crystal shutter transitions to an ON state, that is, a light-shielding state (2409), and the necessity of the next page recording is determined (2410). Here, the incidence angle of the reference light corresponding to the next page is set to a second reference light angle different from the first angle. The recording book is then confirmed (2411), and a post-curing process (2412) is performed. The process is then terminated (2413).

As described above, according to the present example, the liquid crystal shutter is retreated from the optical path, and thus it is possible to achieve an increase in the life span of the liquid crystal shutter, and to perform recording at high speed. In addition, the device can be made smaller than in Example 1.

In addition, in the first to fourth embodiments described so far, a case has been described in which the optical information recording and reproducing device using holography is applied to an optical information recording and reproducing device using an angle multiplexing recording and/or reproduction method as an example, but the application range of the present invention is not limited thereto. For example, the above device can also be applied to an optical information recording and reproducing device using a monocular optical system, an optical information recording and reproducing device using a shift multiplexing recording method inclusive of a collinear method, and an optical information recording and reproducing device using a micro-hologram method of oppositely irradiating a disc which is a recording medium with signal light and reference light.

In addition, in the first to fourth embodiments according to the present invention, an example has been described in which the mechanical shutter and the liquid crystal shutter are disposed at the previous position which is branched into the signal light and the reference light. However, for example, an optical information recording and reproducing device, disposed at the front side of a photo-detector (camera), which has a function as a shutter for the photo-detector (camera) may be used.

In addition, in the first to fourth embodiments according to the present invention, an example has been described in which the mechanical shutter and the liquid crystal shutter are disposed at the previous position which is branched into the signal light and the reference light, but may be disposed closer to the laser light source than the optical system 2 shown in FIG. 1. Therefore, a laser unit, including a shutter unit constituted by the laser light source, the mechanical shutter and the liquid crystal shutter, which is integrated into one configuration may be used.

In addition, in the present embodiment, a case has been described in which the shutter function of the present invention is applied to the optical information recording and/or recording and reproducing device, but the application range is not limited thereto, and the present invention can also be applied to a shutter configuration of a digital camera or the like which requires high speed, high reliability, and high stability, a machine tool, an exposure device or the like using a laser light source.

REFERENCE SIGNS LIST

1: LASER LIGHT SOURCE
2, 11, 17, 21, 24: OPTICAL SYSTEM
3: SHUTTER PORTION
3a: MECHANICAL SHUTTER
3b: MECHANICAL SHUTTER DRIVING ACTUATOR
4a: LIQUID CRYSTAL SHUTTER
4b: LIQUID CRYSTAL SHUTTER MOVING ACTUATOR
4c: LIQUID CRYSTAL ON/OFF CONTROL CIRCUIT
5, 6: PRISM
14: PHOTO-DETECTOR (CAMERA)
15: SPATIAL LIGHT MODULATOR (SLM)
50: OPTICAL INFORMATION RECORDING MEDIUM (DISC)
60: DISC MOTOR
70: CURE SYSTEM
100: LIGHT BEAM
101: SIGNAL LIGHT
111: REFERENCE LIGHT
150: MECHANICAL SHUTTER DRIVING ACTUATOR
150a: DRIVING SHAFT OF MECHANICAL SHUTTER DRIVING ACTUATOR 150
151: MECHANICAL SHUTTER
180: DISC SHUTTER
182: LIQUID CRYSTAL SHUTTER
183: THROUGH-HOLE
200: PICK-UP
300: OPTICAL INFORMATION RECORDING AND REPRODUCING DEVICE

The invention claimed is:

1. An optical information recording and reproducing device that records information on a recording medium and/or reproduces information from the recording medium, using holography, the device comprising:
    a laser light source that performs irradiation with laser light;
    a first light-shielding portion which is capable of switching between transmission and shielding of laser light emitted from the laser light source;
    a driving circuit that drives the switching transmission or shielding of the first light-shielding portion; and
    a first movement portion that moves the first light-shielding portion.

2. The optical information recording and reproducing device according to claim 1, further comprising:
    a second light-shielding portion that shields the laser light emitted from the laser light source; and
    a second movement portion that moves the second light-shielding portion.

3. The optical information recording and reproducing device according to claim 2, wherein a liquid crystal element is used as the first light-shielding portion, and a mechanical shutter is used as the second light-shielding portion.

4. The optical information recording and reproducing device according to claim 2, further comprising a splitter that splits the laser light into signal light and reference light,
    wherein the first light-shielding portion and the second light-shielding portion are disposed between the laser light source and the splitter.

5. The optical information recording and reproducing device according to claim 4, wherein the second light-shielding portion is disposed closer to the laser light source side than the first light-shielding portion.

6. The optical information recording and reproducing device according to claim 1, wherein the movement portion is a rotating movement portion, and the laser light is shielded or transmitted by the movement portion being rotated.

7. The optical information recording and reproducing device according to claim 2, wherein the first light-shielding portion and the second light-shielding portion are integrally placed at the same base, and
    a switching mechanism which is capable of irradiating at least any one of the first light-shielding portion or the second light-shielding portion with a laser from the laser light source is provided.

8. The optical information recording and reproducing device according to claim 2, wherein when information is recorded on the recording medium, the second light-shielding portion is retreated from an optical path of the laser, the first light-shielding portion is inserted into the optical path of the laser, and the driving circuit performs the switching between transmission and shielding of the first light-shielding portion.

9. The optical information recording and reproducing device according to claim 2, wherein when information is reproduced from the recording medium, the first light-shielding portion and the second light-shielding portion are retreated from an optical path of the laser.

10. The optical information recording and reproducing device according to claim 2, wherein when the optical information recording and reproducing device is powered-on, the optical information recording and reproducing device stands by, or the recording medium is loaded into the optical information recording and reproducing device, the second light-shielding portion is inserted into an optical path of the laser, and the first light-shielding portion is retreated from the optical path of the laser.

11. The optical information recording and reproducing device according to claim 2, wherein when a curing process is performed on the recording medium, the second light-shielding portion is inserted into an optical path of the laser, and the first light-shielding portion is inserted into the optical path of the laser.

12. The optical information recording and reproducing device according to claim 2, wherein when a plurality of pieces of page data are recorded on the same region of the recording medium while changing an incidence angle of the reference light on the recording medium, the second light-shielding portion is retreated from an optical path of the laser, and the first light-shielding portion is inserted into the optical path of the laser, and
in a state where the first light-shielding portion transmits the laser, first page data is recorded on the recording medium at a first reference light angle, and
when a change from the first reference light angle to a second reference light angle is performed, the first light-shielding portion shields the laser.

13. The optical information recording and reproducing device according to claim 1, wherein when a plurality of pieces of page data are recorded on the same region of the recording medium while changing an incidence angle of the reference light on the recording medium, the first light-shielding portion is inserted into an optical path of the laser, and
in a state where the first light-shielding portion transmits the laser, first page data is recorded on the recording medium at a first reference light angle, and
when a change from the first reference light angle to a second reference light angle is performed, the first light-shielding portion shields the laser.

14. The optical information recording and reproducing device according to claim 2, wherein when the optical information recording and reproducing device is powered-on, the first light-shielding portion and the second light-shielding portion are inserted into an optical path of the laser, and the first light-shielding portion is in a first state where the laser is shielded, and
after the laser light source is determined to be stabilized, the first state is switched to a second state where the first light-shielding portion and the second light-shielding portion are retreated from the optical path of the laser.

15. The optical information recording and reproducing device according to claim 2, where the first movement portion and the second movement portion are common to each other.

16. An optical information recording method of recording on information on a recording medium, using holography, the method comprising:
a step of performing irradiation with laser light;
a step of splitting the laser light into reference light and signal light;
a step of switching between transmission and shielding of the laser light by a light-shielding portion;
a step of driving the switching between transmission or shielding of the light-shielding portion; and
a step of moving the light-shielding portion,
wherein when a plurality of pieces of page data are recorded on the same region of the recording medium while changing an incidence angle of the reference light on the recording medium,
the light-shielding portion is inserted into an optical path of the laser, and
in a state where the light-shielding portion transmits the laser, first page data is recorded on the recording medium at a first reference light angle, and
when a change from the first reference light angle to a second reference light angle is performed, the light-shielding portion shields the laser.

* * * * *